United States Patent
Tsuboi et al.

(10) Patent No.: US 11,283,581 B2
(45) Date of Patent: Mar. 22, 2022

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Hidekazu Tsuboi, Sakai (JP); Shohei Yamada, Sakai (JP); Kazunari Yokomakura, Sakai (JP); Hiroki Takahashi, Sakai (JP)

(73) Assignees: SHARP KABUSHIKI KAISHA, Sakai (JP); FG INNOVATION COMPANY LIMITED, Tuen Mun (HK)

(*) Notice: Subject to any disclaimer, the term of this patent is extended or adjusted under 35 U.S.C. 154(b) by 0 days.

(21) Appl. No.: 16/472,928

(22) PCT Filed: Dec. 14, 2017

(86) PCT No.: PCT/JP2017/044938
§ 371 (c)(1),
(2) Date: Jun. 24, 2019

(87) PCT Pub. No.: WO2018/123623
PCT Pub. Date: Jul. 5, 2018

(65) Prior Publication Data
US 2019/0356460 A1    Nov. 21, 2019

(30) Foreign Application Priority Data
Dec. 27, 2016   (JP) .............................. JP2016-252807

(51) Int. Cl.
*H04L 5/00* (2006.01)
*H04W 76/11* (2018.01)
(Continued)

(52) U.S. Cl.
CPC ............ *H04L 5/0094* (2013.01); *H04W 8/24* (2013.01); *H04W 74/0833* (2013.01);
(Continued)

(58) Field of Classification Search
None
See application file for complete search history.

(56) References Cited

U.S. PATENT DOCUMENTS

2010/0075679 A1   3/2010 Tenny et al.
2010/0118720 A1   5/2010 Gauvreau et al.
(Continued)

FOREIGN PATENT DOCUMENTS

CN   102088309 A   6/2011
CN   102204386 A   9/2011
(Continued)

OTHER PUBLICATIONS

Official Communication issued in International Patent Application No. PCT/JP2017/044938, dated Feb. 27, 2018.
(Continued)

*Primary Examiner* — Kouroush Mohebbi
(74) *Attorney, Agent, or Firm* — Finnegan, Henderson, Farabow, Garrett & Dunner LLP

(57) ABSTRACT

A terminal apparatus includes a transmitter configured to transmit capability information to the base station apparatus, a receiver configured to receive a radio resource control (RRC) reconfiguration message from the base station apparatus, and a controller configured to configure a parameter, based on a parameter included in the radio resource control reconfiguration message, wherein the capability information includes information on the maximum number of MAC entities supported by the terminal apparatus.

18 Claims, 16 Drawing Sheets

(51) Int. Cl.
*H04W 76/27* (2018.01)
*H04W 8/24* (2009.01)
*H04W 74/08* (2009.01)
*H04W 80/02* (2009.01)

(52) U.S. Cl.
CPC ............ *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2015/0334769 A1 | 11/2015 | Kim et al. | |
| 2016/0135156 A1 | 5/2016 | Lee et al. | |
| 2016/0269974 A1* | 9/2016 | Dinan | H04L 5/0098 |
| 2019/0159057 A1* | 5/2019 | Zhang | H04W 88/10 |
| 2019/0320450 A1* | 10/2019 | Li | H04W 72/0446 |
| 2020/0029291 A1* | 1/2020 | Siomina | H04W 56/0045 |

FOREIGN PATENT DOCUMENTS

| | | |
|---|---|---|
| CN | 105637920 A | 6/2016 |
| CN | 105814921 A | 7/2016 |
| CN | 105979597 A | 9/2016 |
| CN | 106105273 A | 11/2016 |
| CN | 106231637 A | 12/2016 |
| CN | 106255215 A | 12/2016 |
| JP | 2012-503452 A | 2/2012 |
| JP | 2016-077003 A | 5/2016 |
| JP | 2016-220260 A | 12/2016 |
| RU | 2498537 C2 | 11/2013 |
| RU | 2603626 C2 | 11/2016 |
| WO | WO 2016/068072 A1 | 5/2016 |
| WO | WO 2016/153025 A1 | 9/2016 |

OTHER PUBLICATIONS

NTT Docomo, "Revision of SI: Study on New Radio Access Technology", 3GPP TSG RAN Meeting #72, RP-161214, Jun. 13-16, 2016, 8 pages.

LG Electronics, "Discussion on alignment for different numerology multiplexing", 3GPP TSG RAN WG1 Meeting #86, R1-166878, Aug. 22-26, 2016, 5 pages.

Intel Corporation, "MAC entities to support multiple NR verticals", 3GPP TSG-RAN2 Meeting #96, R2-168531, Nov. 14-18, 2016, 5 pages.

Intel Corporation, "MAC entities to support multiple NR verticals", 3GPP TSG-RAN2 Meeting #95bis, R2-166888, Oct. 10-14, 2016, 4 pages.

Search Report issued by the Federal Institute of Industrial Property (FIPS), in related Russian Application No. 2019119567 (2 pgs.). (the search completed: Apr. 2, 2021).

European Patent Office, The extended European search report, pursuant to Rule 62 EPC, the supplementary European search report (EPC) and the European search opinion issued in related Application No. 17888134.8, dated Nov. 30, 2020 (13 pgs.).

LG Electronics, Discussion on potential HARQ operation in NR; 3GPP TSG RAN WG1 Meeting #87 R1-1611847; Reno, USA, Nov. 14-18, 2016 (4 pgs.).

Ericsson, RRC specification evolution, 3GPP TSG-RAN WG2 Meeting #96 R2-168491; Reno, NV, USA Nov. 14-18, 2016 (5 pgs.).

$3^{rd}$ Generation Partnership Project, 3GPP TS 36.331 V14.1.0 (Dec. 2016) Technical Specification Group Radio Access Network; Evolved Universal Terrestrial Radio Access (E-UTRA); Radio Resource Control (RRC); Protocol specification (Release 14) (654 pgs.).

China National Intellectual Property Administration, First Office Action of Application No. 201780075388.3, dated Dec. 2, 2020 (8 pgs.).

Chinese Patent Office, The Second Office Action in related to CN Application No. 201780075388.3, dated Jun. 25, 2021 (English & Chinese version) (8 pages).

Search Report issued by the Chinese Patent Office in related CN Application No. 2017800753883, dated Jun. 25, 2021 (3 pages).

Ericsson, "RRC specification evolution," 3GPP TSG-RAN WG2 Meeting #96, Reno, Nevada, USA, Nov. 14-18, 2016, R2-168491 (5 pages).

* cited by examiner

```
RRCConnectionReconfiguration ::=        SEQUENCE {
    rrc-TransactionIdentifier           RRC-TransactionIdentifier,
    measConfig                          MeasConfig,
    mobilityControlInfo                 MobilityControlInfo,
    dedicatedInfoNASList                SEQUENCE (SIZE(1..maxDRB)) OF DedicatedInfoNAS,
    radioResourceConfigDedicated        RadioResourceConfigDedicated,
    securityConfigHO                    SecurityConfigHO,
    otherConfig                         OtherConfig,
    fullConfig                          ENUMERATED {true},
    sCellToReleaseList                  SCellToReleaseList,
    sCellToAddModList                   SCellToAddModList,
    scg-Configuration                   SCG-Configuration,
    systemInfomationBlockDedicated      OCTET STRING (CONTAINING SIBx)
}
```

FIG. 8

```
MobilityControlInfo ::=    SEQUENCE {
    targetPhysCellId       PhysCellId,
    carrierFreq            CarrierFreqEUTRA,
    carrierBandwidth       CarrierBandwidthEUTRA,
    additionalSpectrumEmission  AdditionalSpectrumEmission,
    t304                   ENUMERATED {
                               ms50, ms100, ms150, ms200, ms500, ms1000,
                               ms2000, spare1},
    newUE-Identity         C-RNTI,
    radioResourceConfigCommon  RadioResourceConfigCommon,
    rach-ConfigDedicated   RACH-ConfigDedicated
}
```

FIG. 9

```
RadioResourceConfigCommon ::=    SEQUENCE [
    rach-ConfigCommon               RACH-ConfigCommon,
    prach-Config                    PRACH-Config,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    antennaInfoCommon               AntennaInfoCommon,
    p-Max                           P-Max,
    tdd-Config                      TDD-Config,
}
```

FIG. 10

```
SCG-Configuration ::= CHOICE {
    release    NULL,
    setup      SEQUENCE {
        scg-ConfigPartMCG    SCG-ConfigPartMCG,
        scg-ConfigPartSCG    SCG-ConfigPartSCG
    }
}
```

FIG. 11

```
SCG-ConfigPartSCG ::=    SEQUENCE {
    radioResourceConfigDedicatedSCG    RadioResourceConfigDedicatedSCG,
    pSCellToAddMod                     PSCellToAddMod,
    sCellToAddModListSCG               SCellToAddModList,
    sCellToReleaseListSCG              SCellToReleaseList,
    mobilityControlInfoSCG             MobilityControlInfoSCG
}
```

FIG. 12

```
RadioResourceConfigDedicated ::=    SEQUENCE {
    srb-ToAddModList            SRB-ToAddModList,
    drb-ToAddModList            DRB-ToAddModList,
    drb-ToReleaseList           DRB-ToReleaseList,
    mac-MainConfig              MAC-MainConfig,
    physicalConfigDedicated     PhysicalConfigDedicated
}
```

FIG. 14

```
RadioResourceConfigDedicated ::=   SEQUENCE {
    srb-ToAddModList              SRB-ToAddModList,
    drb-ToAddModList              DRB-ToAddModList,
    drb-ToReleaseList             DRB-ToReleaseList,
    m-mac-MainConfig              MAC-MainConfig,
    s-mac-MainConfig              MAC-MainConfig,
    physicalConfigDedicated       PhysicalConfigDedicated
}
```

FIG. 15

```
RadioResourceConfigDedicated ::=   SEQUENCE {
    srb-ToAddModList            SRB-ToAddModList,
    drb-ToAddModList            DRB-ToAddModList,
    drb-ToReleaseList           DRB-ToReleaseList,
    mac-MainConfig              SEQUENCE (SIZE (1..maxMac)) OF MAC-MainConfig,
    macIdToAddModList           MACIdToAddModList,
    macIdToRemoveList           MACIdToRemoveList,
    physicalConfigDedicated     PhysicalConfigDedicated
}
```

FIG. 16

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-252807 filed on Dec. 27, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). Furthermore, as a radio access method and a radio access network technology for a fifth-generation cellular system, the 3GPP is conducting a technical study of LTE-Advanced Pro which is an enhanced technology of LTE, and New Radio technology (NR) which is a new radio access technology, and is formulating standards for the technologies (NPL 1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

Furthermore, for NR, communication using multiple different physical parameters (for example, subcarrier spacings) is being studied (NPL 2). Terminal apparatuses are required to determine which of the multiple different physical parameters to be used to communicate with a base station apparatus.

CITATION LIST

Non Patent Literature

NPL 1: RP-161214, NTT DOCOMO, "Revision of SI: Study on New Radio Access Technology", June 2016
NPL 2: 3GPP R1-166878 http://www.3gpp.org/ftp/tsg_ran/WG1_RL1/TSGR1_86/Docs/R1-166878.zip
NPL 3: 3GPP R2-168531 http://www.3gpp.org/ftp/tsg_ran/WG2_RL2/TSGR2_96/Docs/R2-168531.zip

SUMMARY OF INVENTION

Technical Problem

In NR, it has been studied that a base station apparatus and a terminal apparatus communicate using multiple physical parameters (numerologies) based on the capability of the terminal and the physical parameter supported by the cell (NPL 3). However, there has been no study regarding how to notify or apply the necessary parameters, and there has been a problem in that communication between the base station apparatus and the terminal apparatus cannot be performed efficiently.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following measures. Specifically, a first aspect of the present invention is a terminal apparatus for communicating with a base station apparatus via a cell, the terminal apparatus including: a transmitter configured to transmit capability information to the base station apparatus; a receiver configured to receive a radio resource control (RRC) reconfiguration message from the base station apparatus; and a controller configured to configure a parameter, based on the parameter included in the radio resource control reconfiguration message, wherein the capability information includes information on the maximum number of MAC entities supported by the terminal apparatus.

(2) A second aspect of the present invention is a base station apparatus for communicating with a terminal apparatus via a cell, the base station apparatus including: a receiver configured to receive, from the terminal apparatus, capability information including information on the maximum number of MAC entities supported by the terminal apparatus; a transmitter configured to transmit a radio resource control (RRC) reconfiguration message to the terminal apparatus; and a controller configured to generate a parameter to be included in the radio resource control reconfiguration message, wherein the parameter includes at least configuration information for at least one subcarrier spacing corresponding to a data radio bearer, and the configuration information for the at least one subcarrier spacing is configured based on the capability information.

(3) A third aspect of the present invention is a communication method applied to a terminal apparatus for communicating with a base station apparatus via a cell, the communication method at least including the steps of: transmitting capability information to the base station apparatus; receiving a radio resource control (RRC) reconfiguration message from the base station apparatus; and configuring a parameter based on the parameter included in the radio resource control reconfiguration message, wherein the capability information includes information on the maximum number of MAC entities supported by the terminal apparatus.

(4) A fourth aspect of the present invention is an integrated circuit to be mounted on a terminal apparatus for communicating with a base station apparatus via a cell, the integrated circuit causing the terminal apparatus to perform: transmitting capability information to the base station apparatus; receiving a radio resource control (RRC) reconfiguration message from the base station apparatus; and configuring a parameter based on the parameter included in the radio resource control reconfiguration message, wherein the capability information includes information on the maximum number of MAC entities supported by the terminal apparatus.

Advantageous Effects of Invention

According to an aspect of the present invention, the terminal apparatus and the base station apparatus can communicate efficiently.

BRIEF DESCRIPTION OF DRAWINGS

FIG. 8 is a diagram illustrating an example of an RRC connection reconfiguration message according to an embodiment of the present invention.

FIG. 9 is a diagram illustrating an example of elements included in the RRC connection reconfiguration message according to an embodiment of the present invention.

FIG. 10 is a diagram illustrating an example of elements included in the RRC connection reconfiguration message according to an embodiment of the present invention.

FIG. 11 is a diagram illustrating an example of elements included in the RRC connection reconfiguration message according to an embodiment of the present invention.

FIG. 12 is a diagram illustrating an example of elements included in the RRC connection reconfiguration message according to an embodiment of the present invention.

FIG. 14 is a diagram illustrating an example of elements included in the RRC connection reconfiguration message according to an embodiment of the present invention.

FIG. 15 is a diagram illustrating an example of elements included in the RRC connection reconfiguration message according to an embodiment of the present invention.

FIG. 16 is a diagram illustrating an example of elements included in the RRC connection reconfiguration message according to an embodiment of the present invention.

DESCRIPTION OF EMBODIMENTS

Embodiments of the present invention will be described below.

A radio communication system and a radio network according to the present embodiment will be described.

LTE (and LTE-A Pro) and NR may be defined as different Radio Access Technologies (RATs). NR may be defined as a technology included in LTE. LTE may be defined as a technology included in NR. The present embodiment may be applied to NR, LTE and other RATs. Terms associated with LTE are used in the following description. However, the present invention may be applied to other technologies using other terms.

Figure 1:
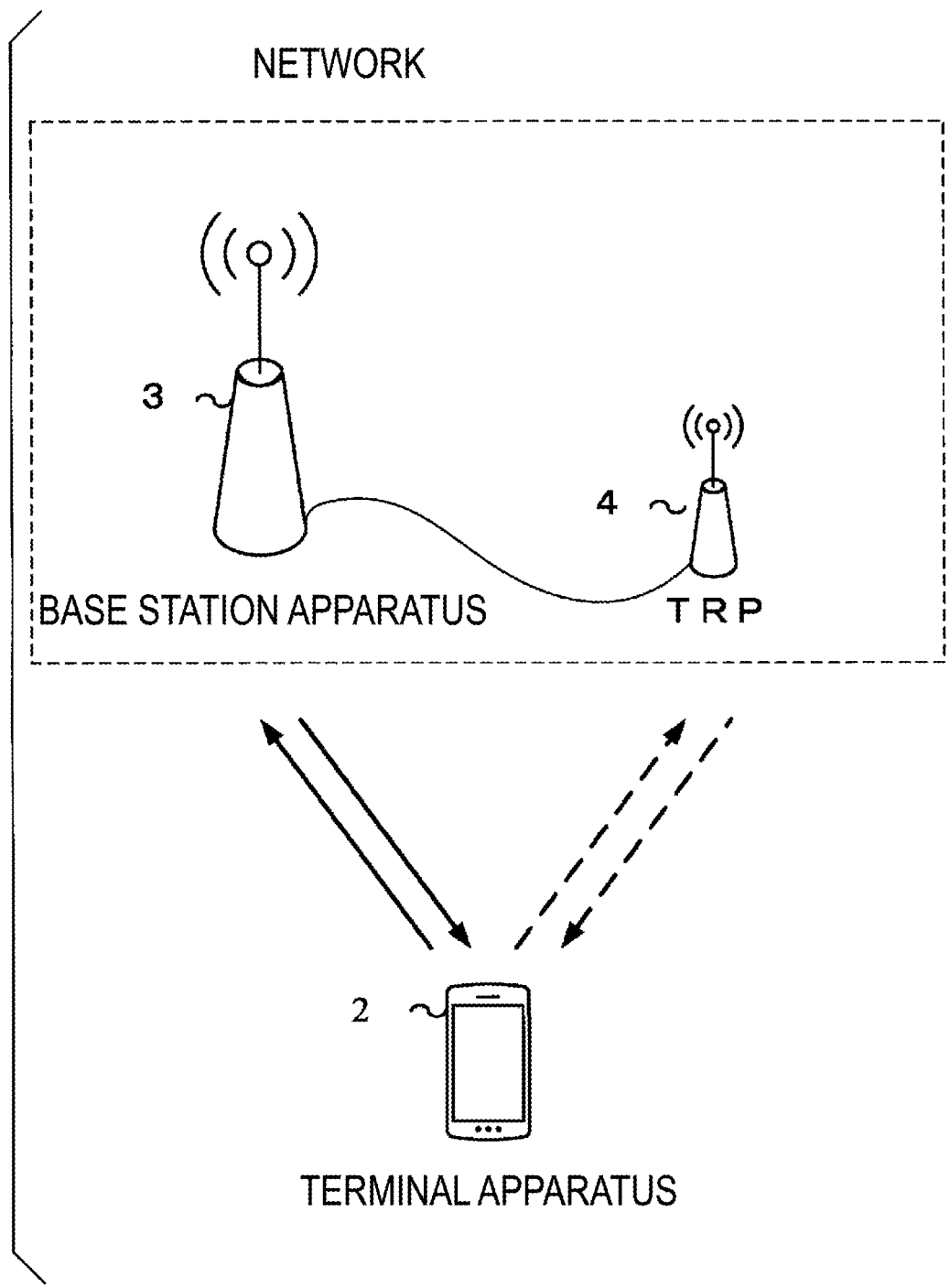
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3. Furthermore, the base station apparatus 3 may include one or more transmission reception points 4 (TRPs). The base station apparatus 3 may configure a coverage (communicable area), controlled by the terminal apparatus 3, to have one or more cells to serve the terminal apparatus 2. The base station apparatus 3 may also configure a coverage (communicable area), controlled by one or more transmission reception points 4, to have one or more cells to serve the terminal apparatus 2. The base station apparatus 3 may also divide one cell into multiple partial areas (also referred to as Beamed areas or Beamed cells) to serve the terminal apparatus 2 in each of the partial areas. Here, a partial area may be identified based on a beam index used for beamforming, a quasi-collocation index, or a precoding index.

The communication area covered by the base station apparatus 3 may vary in size and shape for each frequency. Moreover, the covered area may vary for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A direct radio communication link from the terminal apparatus 2 to another terminal apparatus 2 is referred to as a sidelink.

In FIG. 1, in a radio communication between the terminal apparatus 2 and the base station apparatus 3, and/or a radio communication between the terminal apparatus 2 and another terminal apparatus 2, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 2 and the base station apparatus 3, and/or the radio communication between the terminal apparatus 2 and another terminal apparatus 2, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 2 and the base station apparatus 3, and/or the radio communication between the terminal apparatus 2 and another terminal apparatus 2, the CP may not be used, or the above-described transmission scheme with zero padding may be used instead of the CP. Moreover, the CP or zero padding may be added both forward and backward.

The terminal apparatus 2 operates by regarding the inside of a cell as a communication area. The terminal apparatus 2 may move to another appropriate cell through a cell re-selection procedure in a case that the terminal apparatus 2 is not wirelessly connected (also referred to as an idle state or an RRC_IDLE state). The terminal apparatus 2 may move to another cell through a handover procedure in a case that the terminal apparatus 2 is wirelessly connected (also referred to as a connected state, or an RRC_CONNECTED state). The appropriate cell generally refers to a cell that may be found not to prohibit access from the terminal apparatus 2 based on information indicated by the base station apparatus 3 and that has downlink reception quality satisfying a predefined condition. The terminal apparatus 2 may move to another appropriate cell through a cell re-selection procedure in a case that the terminal apparatus 2 is in a deactivated state (also referred to as an inactive state). The terminal apparatus 2 may move to another cell through a handover procedure in the deactivated state.

In a case that a terminal apparatus 2 can communicate with a certain base station apparatus 3, one of the cells of the base station apparatus 3 configured to be used for the communication with the terminal apparatus 2 may be referred to as a Serving cell while the other cells that are not used for the communication may be referred to as Neighboring cells. Some or all pieces of system information required in the serving cell may be broadcast or notified to the terminal apparatus 2 in another cell.

According to the present embodiment, one or more serving cells are configured for the terminal apparatus 2. In a case that multiple serving cells are configured for the terminal apparatus 2, the configured multiple serving cells may include one primary cell and one or more secondary cells. The primary cell may be a serving cell in which an initial connection establishment procedure has been performed, a serving cell in which a connection re-establishment procedure has been initiated, or a cell which has been indicated as a primary cell during a handover procedure. One or more secondary cells may be configured at a point of time when or after a Radio Resource Control (RRC) connection is established. A cell group (also referred to as a master cell group (MCG)) including one or multiple serving cells including a primary cell (PCell), and one or multiple cell groups (also referred to as secondary cell groups (SCG)) including one or multiple serving cells not including a primary cell and including the primary secondary cell (PS-Cell) in which at least a random access procedure is possible and is not in a deactivated state may be configured for the terminal apparatus 2.

Time Division Duplex (TDD) and/or Frequency Division Duplex (FDD) may be applied to the radio communication system according to the present embodiment. A Time Division Duplex (TDD) scheme or a Frequency Division Duplex (FDD) scheme may be applied to all the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals in the present embodiment will be described.

In FIG. 1, the following physical channels are used for the radio communication between the terminal apparatus 2 and the base station apparatus 3. The physical channels are used for transmission of information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast essential information block, such as Master Information Block (MIB) and Essential Information Block (EIB), which includes Essential information needed by the terminal apparatus 2. Here, one or more essential information blocks may be transmitted as an essential information message. For example, the essential information block may include information about a position within a superframe including multiple radio frames (for example, information for indicating some or all of frame numbers (System Frame Numbers (SFNs)) in the superframe). Furthermore, in a case that different essential information blocks are transmitted in the respective areas within the cell, each essential information block may include information for identifying the corresponding area (for example, identifier information about a transmission beam constituting the area). Moreover, for example, the essential information may include some or all pieces of System Information (SI) needed for connection to the cell or for mobility. The system information may be divided into multiple blocks (system information blocks) depending on an intended use. The system information message may include one or more system information blocks. The essential information message may be a part of the system information message. Some or all of the important information messages may be referred to as minimum system information (Minimum SI). In a case that all of the valid minimum system information in a given cell is not available, the terminal apparatus 2 may consider the cell as a cell (Barred Cell) in which access is prohibited.

The PCCH is used to transmit Uplink Control Information (UCI) in a case of uplink radio communication (radio communication from the terminal apparatus 2 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK). The HARQ-ACK indicated may be a HARQ-ACK for downlink data (Transport block, Medium Access Control Protocol Data Unit (MAC PDU), or Downlink-Shared Channel (DL-SCH)).

The PCCH is used to transmit Downlink Control Information (DCI) in a case of downlink radio communication (radio communication from the base station apparatus 3 to the terminal apparatus 2). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or Uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit system information, Random Access Response (RAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 2 exchange (transmit and/or receive) signals with each other in the higher layers. For example, the base station apparatus 3 and the terminal apparatus 2 may transmit and/or receive, in a Radio Resource Control (RRC) layer, RRC signaling (also referred to as a Radio Resource Control message (RRC message), or Radio Resource Control information (RRC information)). The base station apparatus 3 and the terminal apparatus 2 may transmit and/or receive a Medium Access Control (MAC) control element in a MAC layer. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, information specific to the terminal apparatus 2 (UE Specific information) may be transmitted through signaling dedicated to a certain terminal apparatus 2. The PSCH may be used to transmit UE Capabilities in the uplink. Using a Dedicated Control Channel (DCCH) which is a logical channel to transmit an RRC message means using signaling dedicated (specific) to a certain terminal apparatus 2.

Although the same designations PCCH and PSCH are commonly used for the downlink and the uplink, different channels may be defined for the downlink and for the uplink. For example, the PCCH for the downlink may be defined as a Physical Downlink Control CHannel (PDCCH), and the PCCH for the uplink may be defined as a Physical Uplink Control CHannel (PUCCH). For example, the PSCH for the downlink may be defined as a Physical Downlink Shared CHannel (PDSCH), and the PSCH for the uplink may be defined as a Physical Uplink Shared CHannel (PUSCH).

The PRACH may be used to transmit a random access preamble (random access message 1). The PRACH may be used for indicating the initial connection establishment procedure, the handover procedure, the connection re-establishment procedure, synchronization (timing adjustment) for uplink transmission, and a request for a PUSCH (UL-SCH) resource.

An operation of exclusive OR of CRC parity bits attached to the downlink grant or the uplink grant and identifier information, such as a Cell-Radio Network Temporary Identifier (C-RNTI), a Temporary C-RNTI, and an SPS C-RNTI, may be performed. The C-RNTI and the SPS C-RNTI may be used as identifiers for identifying the terminal apparatus 2 within the cell. The Temporary C-RNTI may be used during a contention based random access procedure.

The C-RNTI may be used to control the PSCH (PDSCH and/or PUSCH) in one subframe. The SPS C-RNTI may be used to periodically allocate a resource for the PSCH (PDSCH and/or PUSCH). The Temporary C-RNTI may be used during random access. Furthermore, the System Information RNTI (SI-RNTI) may be used as an identifier for identifying the system information message. The SI-RNTI may also be used to allocate a PDSCH resource for broadcasting (notifying) the system information message. A system information message may include one or more system information blocks.

In FIG. 1, the following downlink physical signals may be used for the downlink radio communication.

Synchronization signal (SS)

Reference Signal (RS)

The synchronization signal may be used for the terminal apparatus 2 to take synchronization in the frequency domain and the time domain in the downlink. The synchronization signal may include a Primary Synchronization Signal (PSS) and/or a Second Synchronization Signal (SSS). The synchronization signal may also be used to select/identify/determine a base station transmission beam to be used by the base station apparatus 3 for downlink beamforming, and/or a terminal reception beam to be used by the terminal apparatus 2. In other words, the synchronization signal may be used to allow the terminal apparatus 2 to select/identify/determine the index of the base station transmission beam applied to the downlink signal by the base station apparatus 3.

The downlink reference signal (hereinafter simply referred to as reference signal) is mostly used for the terminal apparatus 2 to perform channel compensation on a downlink physical channel. In other words, the downlink reference signal may include a demodulation reference signal. The downlink reference signal may be used for the terminal apparatus 2 to calculate downlink channel state information. In other words, the downlink reference signal may include a channel state information reference signal. Furthermore, the downlink reference signal may be used to determine radio parameters or numerologies for a subcarrier spacing, or used for Fine synchronization sufficient to achieve FFT window synchronization.

The downlink physical channels and the downlink physical signals may be collectively referred to as downlink signals. The uplink physical channels and the uplink physical signals may be collectively referred to as uplink signals.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack for dealing with user data of the terminal apparatus 2 and the base station apparatus 3 is referred to as User-plane (U-plane or UP) protocol stack, and a protocol stack dealing with control data of the terminal apparatus 2 and the base station apparatus 3 is referred to as Control-plane (C-plane or CP) protocol stack.

The Physical layer (PHY layer) uses the Physical Channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are generally classified depending on the type of transmitted information, and specifically, classified into the control channels transmitting the control information and the traffic channels transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs Segmentation of the data received from the higher layer to adjust its data size so that a lower layer can appropriately transmit the data. The RLC layer also has a function to guarantee Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-plane protocol stack. The RRC layer performs configuration and reconfiguration of Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message, which is the control information. The DRB may be used as a path for transmitting the user data. The RBs may be configured between the RRC layers of the base station apparatus 3 and the terminal apparatus 2.

The PHY layer corresponds to a physical layer as the first layer in the layered structure of the generally known Open Systems Interconnection (OSI) model. The MAC layer, the RLC layer, and the PDCP layer correspond to a data link layer as the second layer in the OSI model. The RRC layer corresponds to a network layer as the third layer in the OSI model.

The functional classification of the MAC layer, the RLC layer, and the PDCP layer is exemplary in the above description, and a part or all of each function may not be implemented. Furthermore, some or all of the functions in each layer may be included in another layer. For example, when viewed from the physical layer, the MAC layer control element and the RRC signaling are higher layer signaling. For example, when viewed from the MAC layer, the RRC signaling is higher layer signaling. When viewed from the RRC layer, the MAC layer and the physical layer are lower layers. When viewed from the RRC layer, for example, the NAS layer is also referred to as an Upper Layer.

Signaling protocols used between the network and the terminal apparatus 2 are divided into an Access Stratum (AS) protocol and a Non-Access Stratum (NAS) protocol. For example, the protocol in the RRC layer and its lower layers is the Access Stratum protocol used between the terminal apparatus 2 and the base station apparatus 3. Furthermore, the protocol in Connection Management (CM), Mobility Management (MM), or the like of the terminal apparatus 2 is the Non-Access Stratum protocol, and is used between the terminal apparatus 2 and a core network (CN). For example, a communication using the Non-Access Stratum protocol is transparently performed via the base station apparatus 3 between the terminal apparatus 2 and a Mobility Management Entity (MME).

Hereinafter, the subframe will be described. The subframe in the embodiment may also be referred to as a resource unit, a radio frame, a time period, or a time interval. Furthermore, one or more subframes may constitute one radio frame.

Figure 2:
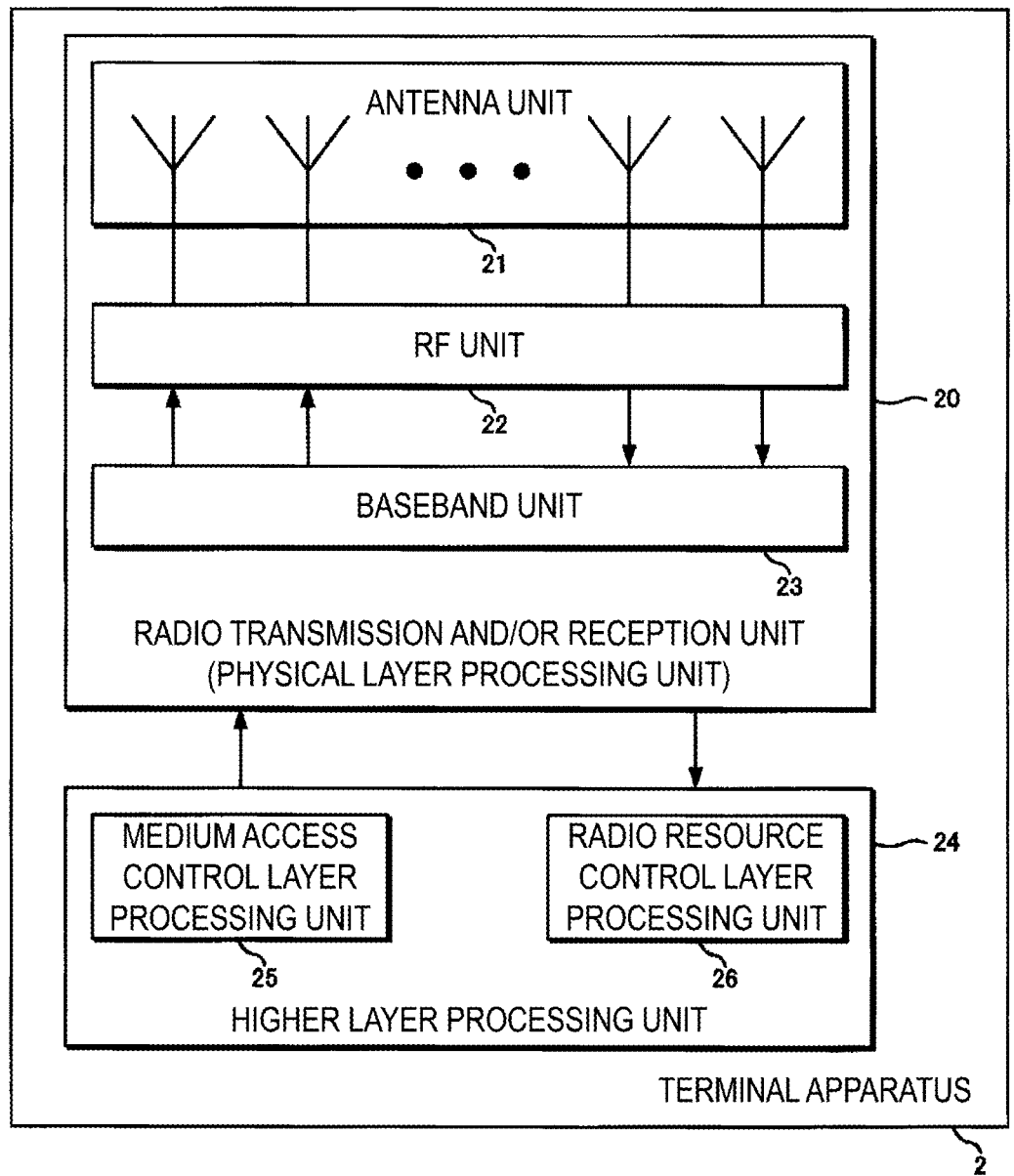
FIG. 2 is a block diagram illustrating an example of a schematic configuration of a terminal apparatus according to an embodiment of the present invention.
Figure 4:
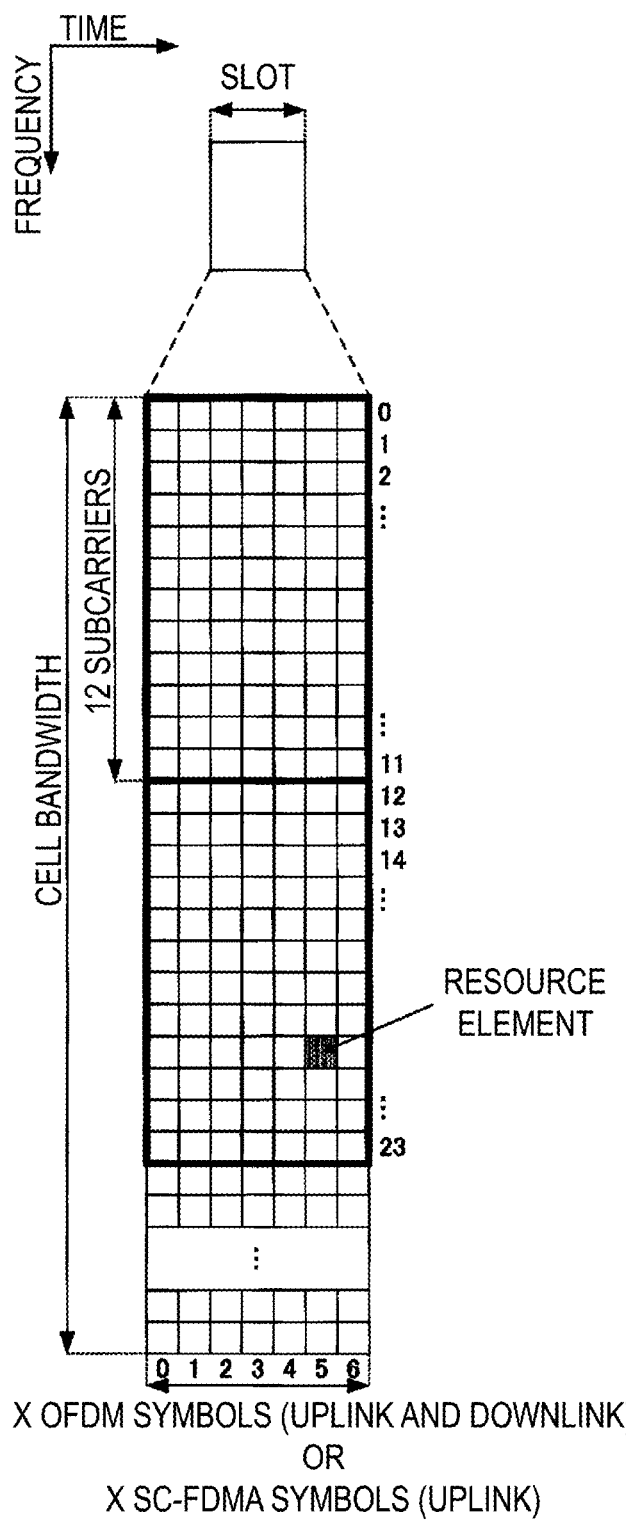
FIG. 4 is a diagram illustrating an example of a schematic configuration of a downlink slot according to an embodiment of the present invention.

FIG. 4 is a diagram illustrating an example of a schematic configuration of a downlink slot according to the embodiment of the present invention. Each of the radio frames is 10 ms in length. Each of the radio frames includes 10 subframes and X slots. In other words, a length of one subframe is 1 ms. For each of the slots, a time length is defined depending on a subcarrier spacing. For example, in a case that a subcarrier spacing of OFDM symbols is 15 kHz with an NCP (Normal Cyclic Prefix), X=7 or X=14, and 0.5 ms and 1 ms, respectively. In addition, in a case that the subcarrier spacing is 60 kHz, X=7 or X=14, and 0.125 ms and 0.25 ms, respectively. FIG. 2 illustrates a case of X=7 as an example. Note that the example can be similarly expanded to a case of X=14. The uplink slot may be defined similarly, and the downlink slot and the uplink slot may be defined separately.

The signal or the physical channel transmitted in each of the slots is expressed by a resource grid. The resource grid is defined by multiple subcarriers and multiple OFDM symbols. The number of subcarriers constituting one slot depends on cell downlink and uplink bandwidths. Each element within the resource grid is referred to as a resource element. The resource element may be identified by a subcarrier number and an OFDM symbol number.

A resource block is used to express mapping of resource elements for a certain physical downlink channel (such as the PDSCH) or a certain physical uplink channel (such as the PUSCH). For the resource block, a virtual resource block and a physical resource block are defined. A certain physical uplink channel is first mapped to a virtual resource block. Thereafter, the virtual resource block is mapped to the physical resource block. In the case that the number X of OFDM symbols included in the slot is 7 (X=7) with the NCP, one physical resource block is defined by seven OFDM symbols consecutive in the time domain and by 12 subcarriers consecutive in the frequency domain. Specifically, one physical resource block includes (7×12) resource elements. In a case of an Extended CP (ECP), one physical resource block is defined by six OFDM symbols consecutive in the time domain and by 12 subcarriers consecutive in the frequency domain, for example. Specifically, one physical resource block includes (6×12) resource elements. At this time, one physical resource block corresponds to one slot in the time domain and corresponds to 180 kHz in the frequency domain in a case of the 15 kHz subcarrier spacing (or, 720 kHz in a case of the 60 kHz subcarrier spacing). The physical resource blocks are numbered from zero in the frequency domain.

Figure 5:
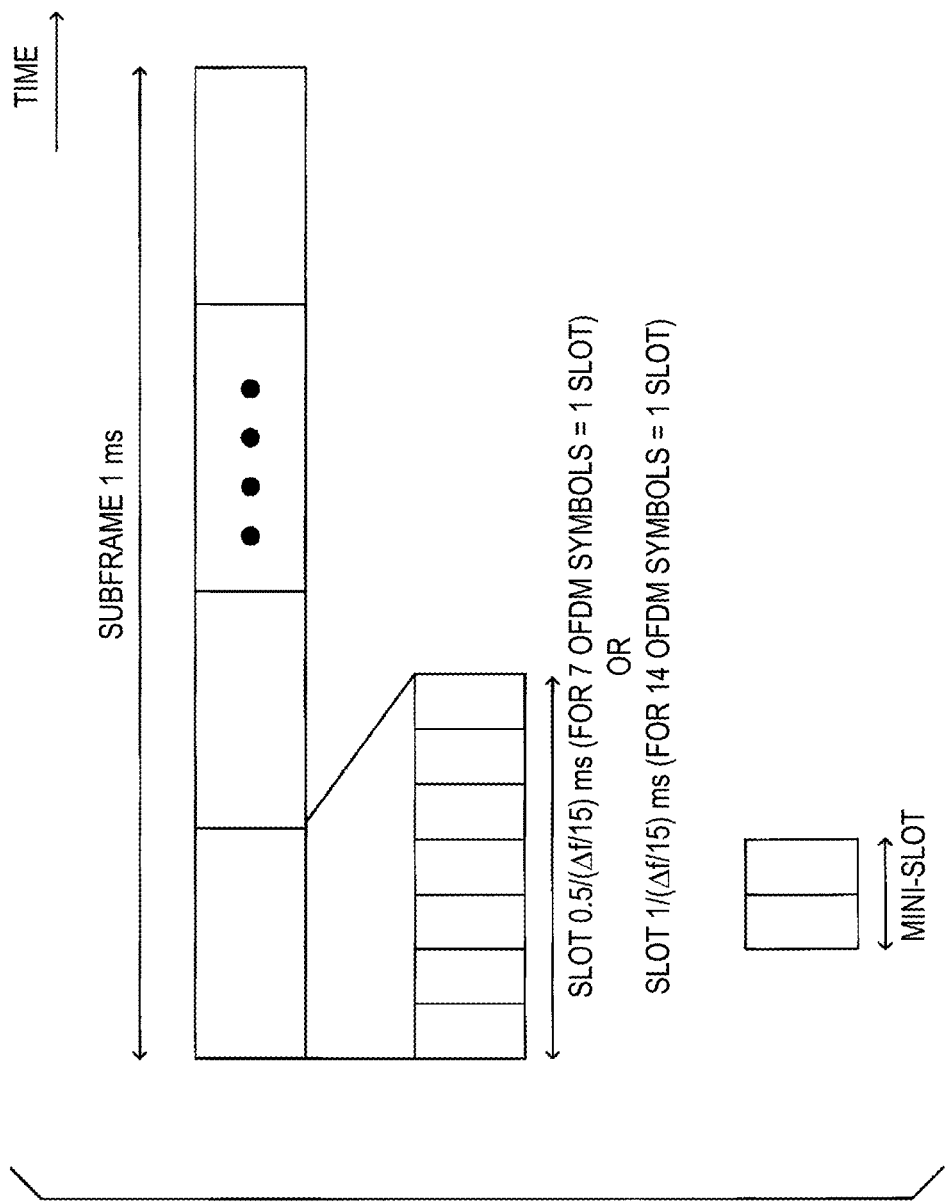
FIG. 5 is a diagram illustrating a relationship between a subframe, a slot, and a mini-slot in a time domain according to an embodiment of the present invention.

Next, the subframe, the slot, and the mini-slot will be described. FIG. 5 is a diagram illustrating a relationship between the subframe, the slot, and the mini-slot in the time domain. As illustrated in the drawing, three time units are defined. The subframe is 1 ms regardless of the subcarrier spacing, the number of OFDM symbols included in the slot is 7 or 14, and the slot length depends on the subcarrier spacing. Here, in a case that the subcarrier spacing is 15 kHz, 14OFDM symbols are included in one subframe. Thus, in a case that the subcarrier spacing is $\Delta f$ (kHz), the slot length may be defined as $0.5/(\Delta f/15)$ ms in the case that the number of OFDM symbols constituting one slot is 7. Here, $\Delta f$ may be defined by the subcarrier spacing (kHz). In the case that the number of OFDM symbols constituting one slot is 7, the slot length may be defined as $1/(\Delta f/15)$ ms. Here, $\Delta f$ may be defined by the subcarrier spacing (kHz). Furthermore, in a case that the number of OFDM symbols included in the slot is X, the slot length may be defined as $X/14/(\Delta f/15)$ ms.

The mini-slot (which may be referred to as a sub-slot) is a time unit including OFDM symbols that are less than the number of OFDM symbols included in the slot. The drawing illustrates a case that the mini-slot includes two OFDM symbols as an example. The OFDM symbol in the mini-slot may match an OFDM symbol timing that constitutes the slot. Note that a minimum unit of scheduling may be a slot or a mini-slot.

Figure 6:
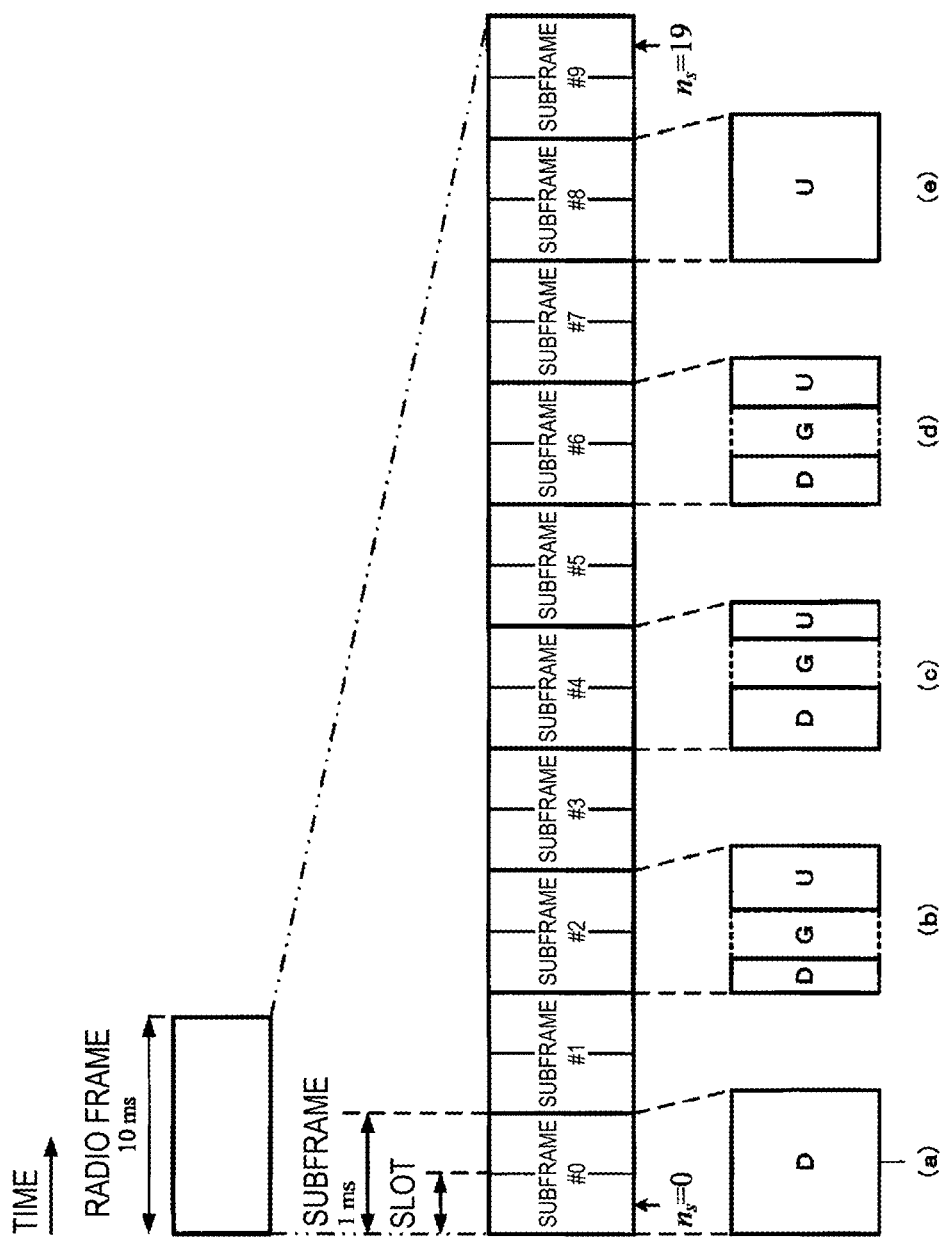
FIG. 6 is a diagram illustrating an example of a slot or a subframe according to an embodiment of the present invention.

FIG. 6 is a diagram illustrating an example of the slot or the subframe (subframe type). Here, a case that the slot length is 0.5 ms in the subcarrier spacing 15 kHz is illustrated as an example. In the drawing, D represents the downlink, and U represents the uplink. As illustrated in the drawing, during a certain time period (for example, the minimum time period to be allocated to one UE in the system), the subframe may include one or more of the followings:

a downlink part (duration),
a gap, and
a uplink part (duration).

Part (a) in FIG. 6 is an example in which in a certain time period (which may be referred to as, for example, a minimum unit of time resource that can be allocated to one UE, a time unit, or the like, or multiple minimum units of time resource may be bundled and referred to as a time unit) is entirely used for downlink transmission. Part (b) in FIG. 6 illustrates an example in which an uplink is scheduled via a PCCH for example by using the first time resource, and through a gap for a processing delay of the PCCH, a time for switching from a downlink to an uplink, and generation of a transmit signal, an uplink signal is transmitted. Part (c) in FIG. 6 illustrates an example in which a downlink PCCH and/or downlink PSCH are transmitted by using the first time resource, and a PSCH or PCCH is transmitted after a gap for a processing delay, through a gap for a processing delay of the PCCH, a time for switching from a downlink to an uplink, and generation of a transmit signal, and then, the PSCH or PCCH is transmitted. Here, as an example, the uplink signal may be used to transmit the HARQ-ACK and/or CSI, namely, the UCI. Part (d) in FIG. 6 illustrates an example in which a downlink PCCH and/or downlink PSCH are transmitted by using the first time resource, and a PSCH or PCCH is transmitted after a gap for a processing delay, through a gap for a processing delay of the PCCH, a time for switching from a downlink to an uplink, and generation of a transmit signal, and then, the uplink PSCH and/or PCCH is transmitted. Here, as an example, the uplink signal may be used to transmit the uplink data, namely, the UL-SCH. Part (e) of FIG. 6 illustrates an example in which the entire subframe is used for uplink transmission (uplink PSCH or PCCH).

The above-described downlink part and uplink part may include multiple OFDM symbols as is the case in LTE.

Here, a resource grid may be defined with multiple subcarriers and multiple OFDM symbols or SC-FDMA symbols. The number of subcarriers constituting one slot may depend on a cell bandwidth. One downlink part and one uplink part may each include one or more OFDM symbols, or two or more OFDM symbols. Here, each element within the resource grid is referred to as a resource element. Furthermore, the resource element may be identified using a subcarrier number and an OFDM symbol or SC-FDMA symbol number.

The base station apparatus 3 may transmit a signal with any subframe configuration in FIG. 6.

A description is given of an example of an operation of adding a cell (first cell) of a first base station apparatus 3 or a cell (second cell) of a second base station apparatus 3 as a cell of the secondary cell group (e.g., primary secondary cell (PSCell)) in a state in which the terminal apparatus 2 in a connected state or an deactivated state is in communication, and the cell (first cell) of the first base station apparatus 3 being the primary cell of the master cell group.

Here, a procedure for changing the cell group including mobility control information (MobilityControlInfoSCG) for the secondary cell group is described, but the operation is not limited thereto and can be applied also to a case of adding the secondary cell group or a case of changing the numerology not including the mobility control information for the secondary cell group (or without adding and changing the secondary cell group).

First, a description is given of a configuration (addition or change) of the numerologies for the secondary cell group in a case that the secondary cell group does not include the first cell (for example, in a case that the PCell and the PSCell are different cells).

The configuration of the numerologies may involve a reset or Re-establishment of the second layers (PDCP layer, RLC layer, and/or MAC layer). The configuration of the numerologies may involve performing random access in the PSCell. A secondary cell group configuration may be a synchronous secondary cell group reconfiguration procedure (procedure with random access) including the reset and/or re-establishment of the second layer. In a case that the DRB of the secondary cell group is configured, the secondary cell group configuration may be a synchronous secondary cell group reconfiguration procedure (procedure with random access) including a refresh of security. The procedure may be used in various scenarios. For example, the scenario is an Establishment of the secondary cell group, a change in the PSCell, a refresh of a security key, a change in the DRB, and/or a change in the numerology. The terminal apparatus 2 may perform operations related to the secondary cell group configuration by receiving an RRC connection reconfiguration message including the mobility control information (mobilityControlInfoSCG) for the secondary cell group.

The network controls the mobility of the terminal apparatus 2 in the connected state. The network may control the mobility of the terminal apparatus 2 in the deactivated state.

In the mobility by the network control, the PCell may be changed using the RRC connection reconfiguration message including the mobility control information. In the mobility by the network control, the SCell may be changed using the RRC connection reconfiguration message including (or not including) the mobility control information.

The secondary cell group may be established, reconfigured, or released using the RRC connection reconfiguration message including (or not including) the mobility control information for the secondary cell group. In a case that the random access to the PSCell is required in the secondary cell group reconfiguration, a secondary cell group changing procedure (i.e., the RRC connection reconfiguration message including mobilityControlInfoSCG) may be used.

Figure 7:
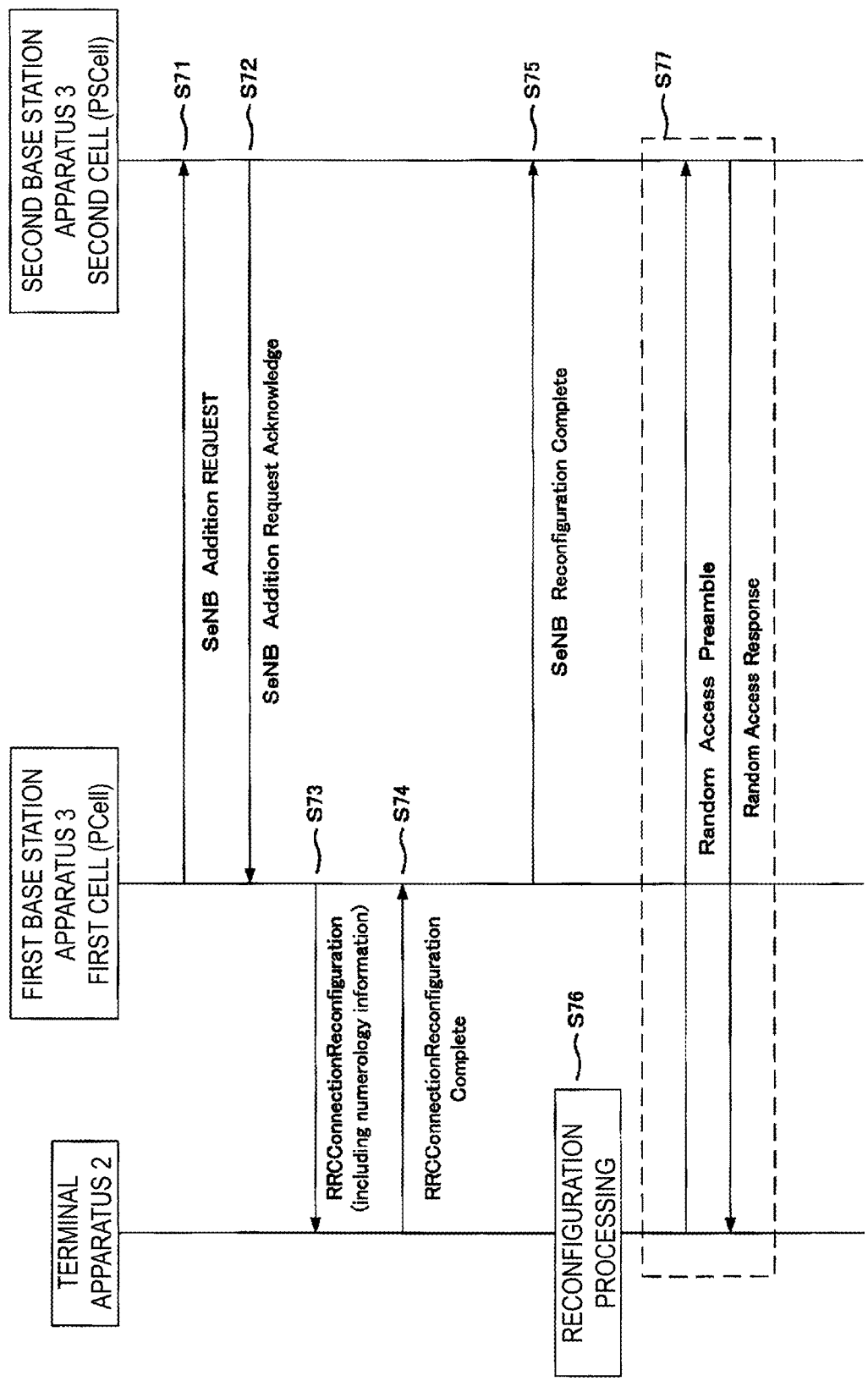
FIG. 7 is a diagram illustrating an example of an SCG configuration procedure according to an embodiment of the present invention.

In FIG. 7, first, the first base station apparatus 3 notifies the second base station apparatus 3 of a secondary cell addition request message (SeNB Addition Request) of the terminal apparatus 2 (step S71). The secondary cell addition request message may include some or all of information about a communication capability of the terminal apparatus 2, allocation information for network resources, allocation information for radio resources, information on numerologies used by the terminal apparatus 2, information on numerologies the terminal apparatus 2 wants to use, and information on numerologies supported by the first base station apparatus 3.

In a case that the second base station apparatus 3 that has received the secondary cell addition request message at step S71 acknowledges the secondary cell addition request, the second base station apparatus 3 notifies the first base station apparatus 3 of a secondary cell addition request acknowledge message (SeNB Addition Request Acknowledge) (at step S72). The secondary cell addition request acknowledge message may include a configuration for the terminal apparatus 2 by the second base station apparatus 3. For example, the secondary cell addition request acknowledge message may include some or all of the RRC connection reconfiguration message configured for the terminal apparatus 2.

An example of the RRC connection reconfiguration message will be described using FIG. 8.

As illustrated in FIG. 8, the RRC connection reconfiguration message may include some or all of (8A) rrc-TransactionIdentifier, (8B) measConfig, (8C) mobilityControlInfo, (8D) dedicatedInfoNASList, (8E) radioResourceConfigDedicated, (8F) securityConfigHO, (8G) otherConfig, (8H) fullConfig, (8I) sCellToReleaseList, (8J) sCellToAddModList, and (8K) systemInfomationBlockDedicated.

(8A) rrc-TransactionIdentifier is an element used to identify RRC procedures (transactions) and has a value of an integer from 0 to 3, for example. (8B) measConfig is information for configuring a measurement Performed by the terminal apparatus 2 and may include a configuration of a gap period for measurement. (8D) dedicatedInfoNASList is a list of NAS layer information specific to the terminal apparatus 2 exchanged between the network and the terminal apparatus 2 and includes NAS layer information for each DRB, and the RRC layer transfers this information to the higher layer (NAS layer) transparently. (8E) radioResourceConfigDedicated may include information used to configure, change, and/or release the SRB and DRB, information for changing a MAC layer configuration, information about a channel configuration for the physical layer, and the like. (8F) securityConfigHO is a configuration for security, and may include, for example, a configuration of an Integrity Protection algorithm in AS layers of the SRB, a configuration of a Ciphering algorithm of the SRB and/or the DRB, and the like. (8H) fullConfig is information indicating whether or not a specific option is applied to this RRC connection reconfiguration message, and the terminal apparatus 2 may apply a configuration included in a specific element in a case that (8H) fullConfig is included in the RRC connection reconfiguration message. (8I) sCellToReleaseList and (8J) sCellToAddModList may include information used to add, modify, and/or release the secondary cell. (8K) systemInfomationBlockDedicated may include a portion of the notification information for the target cell.

(8C) mobilityControlInfo includes parameters necessary for the mobility by the network control (e.g., handover), as illustrated in FIG. 9. (8C) mobilityControlInfo may include some or all of (9A) targetPhysCellId, (9B) carrierFreq, (9C) carrierBandwidth, (9D) t304, (9E) newUE-Identity, (9F) radioResourceConfigCommon, and (9G) rach-ConfigDedicated. The (8C) mobilityControlInfo may also include various other information.

(9A) targetPhysCellId indicates an identifier of the target cell (e.g., a physical cell identifier). (9B) carrierFreq indicates information on the frequency used by the terminal apparatus 2 in the target cell. (9C) carrierBandwidth indicates information on the downlink and/or uplink bandwidth of the target cell. (9D) t304 indicates a value of a timer for the handover, and for example, the terminal apparatus 2 may perform the predetermined process in a case that the handover is not successfully completed within a time indicated by the timer. (9E) newUE-Identity indicates a new identifier (e.g., C-RNTI) of the terminal apparatus 2 in the target cell.

(9F) radioResourceConfigCommon includes information used to Specify common radio resource configurations, such as random access parameters and static physical layer parameters, as illustrated in FIG. 10. (9F) radioResourceConfigCommon may include some or all of (10A) rach-ConfigCommon, (10B) prach-Config, (10C) pdsch-ConfigCommon, (10D) pusch-ConfigCommon, (10E) pucch-ConfigCommon, (10F) soundingRS-UL-ConfigCommon, (10G) uplinkPowerControlCommon, (10H) antennaInfoCommon, and (10I) p-Max, (10J) tdd-Config. (9F) radioResourceConfigCommon may also include various other information. In addition, the configurations of (10C) pdsch-ConfigCommon and (10D) pusch-ConfigCommon may be set together as a single configuration (psch-ConfigCommon).

(10A) rach-ConfigCommon includes information used to specify Generic random access parameters. For example, (10A) rach-ConfigCommon includes, as information on the random access preamble, some or all of a number of preambles not used individually (or Non-dedicated), threshold information for determining which preamble of any group of the grouped preambles is to be used, and/or information about power ramping.

(10B) prach-Config includes information used to specify a PRACH configuration. For example, (10B) prach-Config may include some or all of root sequence index information of the random access preamble, information on the time/frequency resource used for the random access preamble transmission, and/or information on numerologies used for preamble transmission.

(10C) pdsch-ConfigCommon includes information for specifying a common PDSCH configuration. For example, (10C) pdsch-ConfigCommon may include some or all of information on energy per unit resource of the downlink reference signal, information about the power ratio of the downlink reference signal and PDSCH, and/or information on numerologies used to receive the PDCCH and/or PDSCH.

(10D) pusch-ConfigCommon includes information for specifying a common PUSCH configuration and/or an uplink reference signal configuration. For example, (10D) pusch-ConfigCommon may include some or all of PUSCH resource band information, hopping information, and/or information on numerologies used to transmit the PUCCH and/or PUSCH.

(10E) pucch-ConfigCommon includes information for specifying a common PUCCH configuration. For example, (10E) pucch-ConfigCommon may include the information on the numerologies used to transmit the PUCCH. (10F) soundingRS-UL-ConfigCommon includes information for specifying a common uplink reference signal configuration that can be used for measurement by the base station apparatus 3. For example, (10F) soundingRS-UL-Config-Common may include information on numerologies used to transmit some or all of the uplink reference signals. (10G) uplinkPowerControlCommon includes information for specifying a common uplink power control configuration. (10H) antennaInfoCommon includes information for specifying a common antenna configuration. (10I) p-Max includes information for limiting uplink transmission by the terminal apparatus 2. (10J) tdd-Config includes information for specifying a TDD specific physical channel configuration.

(9G) rach-ConfigDedicated includes information used to specify individual random access parameters allocated to the terminal apparatus 2. For example, it may include some or all of information explicitly indicating the format or time/frequency resource of the random access preamble, and/or information on numerologies used to transmit the preamble.

(8G) otherConfig includes some or all of the other configurations.

Further, (8C) mobilityControlInfo or any of the information elements included in (8C) mobilityControlInfo may include information specifying the numerologies for some or all of (1) a random access preamble and (2) a PUSCH including an RRC connection reconfiguration complete message which are transmitted by the terminal apparatus 2 in the target cell, and (1) a synchronization signal, (2) an important information block, (3) a PDCCH for receiving a PDSCH including a random access response message, (4) a PDSCH including a random access response message, (5) a PDCCH for receiving a PDSCH including an invocation (paging) message, and (6) a PDSCH including an invocation (paging) message which are received by the terminal apparatus 2 in the target cell.

An example of the secondary cell group configuration (SCG-Configuration) included in the RRC connection reconfiguration message will be described using FIG. 11.

As illustrated in FIG. 11, the secondary cell group configuration may include some or all of (11A) scg-ConfigPartMCG and (11B) scg-ConfigPartSCG.

(11A) scg-ConfigPartMCG is a configuration associated with also the master cell group in a case that the secondary cell group is configured, and may include, for example, information about updating of key information and/or information about power of master cell groups and secondary cell groups, and the like. (11B) scg-ConfigPartSCG is a secondary cell group configuration, and may include, for example, (12A) radioResourceConfigDedicatedSCG, pSCellToAddMod, (12C) sCellToAddModListSCG, (12D) sCellToReleaseListSCG, and/or (12E) mobilityControlInfoSCG, as illustrated in FIG. 12.

(12A) radioResourceConfigDedicatedSCG is a radio resource configuration specific to the terminal apparatus 2 for the SCG, and may include information for adding/changing the DRB, MAC layer configuration information, a timer configuration value, and/or constant information. (12B) pSCellToAddMod is addition/modification information of a cell to be the PSCell cell, and may include index information for identifying the SCell (PSCell), an identifier of the cell (e.g., a physical cell identifier or cell global identifier), downlink carrier frequency information, a common radio resource configuration for the PSCell, and/or information on a radio resource configuration specific to the terminal apparatus 2 in the PSCell.

(12C) sCellToAddModListSCG is addition/modification information of a cell to be the SCell of the secondary cell group and may include one or more lists of SCell information. Furthermore, each piece of SCell information may include SCell index information for identifying the SCell, an identifier of the cell (e.g., a physical cell identifier or a cell global identifier), downlink carrier frequency information, and/or information on a common radio resource configuration for the SCell. (12D) sCellToReleaseListSCG is information for releasing the SCell of the secondary cell group, and may include one or more lists of SCell index information.

(12E) mobilityControlInfoSCG is information required to change the secondary cell group, and may include an identifier assigned to the terminal apparatus 2 in the secondary cell group, information used to specify the individual random access parameters allocated to the terminal apparatus 2, and/or information about a ciphering algorithm.

Here, (11B) scg-ConfigPartSCG or any of the information elements included in (11B) scg-ConfigPartSCG may include information specifying the numerologies for some or all of (1) a random access preamble, (2) a PUCCH, and (3) PUSCH which are transmitted in a cell (PSCell or all SCells) of the secondary cell group to which the terminal apparatus 2 is reconfigured, and (1) a synchronization signal, (2) a PDCCH for receiving a PDSCH including a random access response message, (3) a PDSCH including a random access response message, (4) a PDCCH for receiving a PDSCH including an invocation (paging) message, and (5) a PDSCH including an invocation (paging) message which are received in a cell (PSCell or all SCells) of the secondary cell group to which the terminal apparatus 2 is reconfigured.

For example, as a part of information used to specifying the individual random access parameters assigned to the terminal apparatus 2 included in the (12E) mobilityControlInfoSCG, the information on the numerologies used to transmit the preamble may be included. In a case that common numerologies are used in the cells of the secondary cell group, (12B) pSCellToAddMod may include the information on the numerologies which are used by the PSCell (or common to the cells of the secondary cell group) for transmitting and/or receiving the signal and/or channel described above. In a case that independent numerologies are used in the cells of the secondary cell group, each piece of the SCell information in (12B) pSCellToAddMod and/or (12C) sCellToAddModListSCG may include the information on the numerologies for each SCell used for transmitting the signal and/or channel described above.

The RRC connection reconfiguration message (e.g., the MAC layer configuration information for each of (8E) radioResourceConfigDedicated and (12A) radioResourceConfigDedicatedSCG) can include information on numerologies so that the numerology used in each cell (or cell group) can be specified.

Note that the above message is an example, and the RRC connection reconfiguration message may include information other than the above RRC connection reconfiguration message, or may not include some pieces of information of the RRC connection reconfiguration message. The RRC connection reconfiguration message may be different from the above RRC connection reconfiguration message in a structure, an information element name, or a parameter name.

The first base station apparatus 3 that receives the secondary cell addition request acknowledge message notifies the terminal apparatus 2 of an RRC connection reconfiguration message (RRCConnectionReconfiguration) including a configuration for the terminal apparatus 2 to indicate to the terminal apparatus 2 to configure the secondary cell group including the addition of the second cell (step S73).

The terminal apparatus 2 that can receive the RRC connection reconfiguration message and follow the configuration including the RRC connection reconfiguration message transmits an RRC connection reconfiguration complete message (RRCConnectionReconfigurationComplete) to the first base station apparatus 3 (step S74). Furthermore, based on the information on the RRC connection reconfiguration message, the terminal apparatus 2 starts the following reconfiguration processing (step S76). The first base station apparatus 3 that has received the RRC connection reconfiguration complete message (RRCConnectionReconfigurationComplete) notifies the second base station apparatus 3 of a reconfiguration complete message (SeNB Reconfiguration Complete) (step 75).

In the reconfiguration process at step S76, in a case that the RRC connection reconfiguration message includes mobility control information for the secondary cell group and does not include mobility control information for the master cell group (that is, no handover), or in a case that the secondary cell group configuration included in the RRC connection reconfiguration message is configured to be released, the terminal apparatus 2 may reset the function of the MAC layer for the secondary cell group based on the configuration. In the case that the RRC connection reconfiguration message includes the mobility control information for the secondary cell group and does not include the mobility control information for the master cell group (that is, no handover), or in the case that the secondary cell group configuration included in the RRC connection reconfiguration message is configured to be released, the terminal apparatus 2 may perform re-establishment on the PDCP layer or data recovery. In the case that the RRC connection reconfiguration message includes the mobility control information for the secondary cell group, or in the case that the secondary cell group configuration included in the RRC connection reconfiguration message is configured to be released, the terminal apparatus 2 may perform re-establishment on the RLC layer for the master cell group and/or the RLC layer for the secondary cell group. In the case that the RRC connection reconfiguration message includes the mobility control information for the secondary cell group and does not include the mobility control information for the master cell group (that is, no handover), or in the case that the secondary cell group configuration included in the RRC connection reconfiguration message is configured to be released, the terminal apparatus 2 may put a cell other than the PSCell among the SCells of the secondary cell group into the deactivated state.

In the reconfiguration process at step S76, in a case that the received secondary cell group configuration is configured to be released, the terminal apparatus 2 may release the secondary cell group configuration other than the DRB configuration to stop the timer for the secondary cell group.

In the reconfiguration process at step S76, in a case that the RRC connection reconfiguration message includes a radio resource configuration specific to the terminal apparatus 2, the terminal apparatus 2 may reconfigure the specific radio resource configuration. In a case that the RRC connection reconfiguration message includes addition/modification information of a cell to be the PSCell, the terminal apparatus 2 performs addition or modification of the PSCell. In a case that the RRC connection reconfiguration message includes addition/modification information of a cell to be the SCell of the secondary cell group, the terminal apparatus 2 may perform addition or modification of the SCell of the secondary cell group. In a case that the RRC connection reconfiguration message includes information for releasing the SCell of the secondary cell group, the terminal apparatus 2 may perform release of the SCell of the secondary cell group.

In the case that the RRC connection reconfiguration message includes the mobility control information for the secondary cell group, the terminal apparatus 2 may start downlink synchronization to a target PSCell (second cell).

Here, in a case that numerology information for the synchronization signal is included in the RRC connection reconfiguration message, the terminal apparatus 2 may detect the synchronization signal, based on the information. In a case that the numerology information for the synchronization signal is not provided in the RRC connection reconfiguration message, the terminal apparatus 2 may attempt to detect the synchronization signal by using a pre-determined numerology. Accordingly, the numerology for the synchronization signal detected in a case that there are multiple numerologies that may be used for the synchronization signal to the target cell can be uniquely specified.

Then, the terminal apparatus 2 initiates the random access procedure to transmit the uplink data, and transmits the random access preamble. The second base station apparatus 3 that has received the random access preamble detects a deviation in a transmission timing of the terminal apparatus 2, and transmits a random access response including information (timing advance command) for correcting the deviation to the terminal apparatus 2 (step S77). In a case that the numerology information for the random access preamble is included in the RRC connection reconfiguration message, the terminal apparatus 2 may transmit the random access preamble, based on the information. In a case that the numerology information for the random access preamble is not provided in the RRC connection reconfiguration message, the terminal apparatus 2 may transmit the random access preamble by using the pre-determined numerology. In this way, the appropriate numerology can be configured for each terminal apparatus 2 in the case that multiple numerologies are supported in the target cell. In a case that the numerology information for receiving the random access response is included in the RRC connection reconfiguration message, the terminal apparatus 2 may receive the random access response, based on the information. In a case that the numerology information for receiving the random access response is not provided in the RRC connection reconfiguration message, the terminal apparatus 2 may receive the random access response by using a pre-determined numerology or a numerology the same as for the synchronized synchronization signal. In this way, the appropriate numerology can be configured for each terminal apparatus 2 in the case that multiple numerologies are supported in the target cell.

Next, in a case that the secondary cell group includes the first cell (for example, in a case that the PCell and the PSCell are the same cell), the configuration (addition or modification) of the numerologies will be described.

The configuration of the numerologies may not involve a reset or Re-establishment of some of the second layers (PDCP layer, RLC layer, and/or MAC layer). The configuration of the numerologies need not involve performing random access in the PSCell. The secondary cell group configuration may be a secondary cell group reconfiguration procedure (a procedure without random access) not including a reset and/or re-establishment of some of the second layers. The terminal apparatus 2 may perform operations related to the secondary cell group configuration by receiving the RRC connection reconfiguration message including the mobility control information (mobilityControlInfoSCG) for the secondary cell group.

The network controls the mobility of the terminal apparatus 2 in the connected state. The network may control the mobility of the terminal apparatus 2 in the deactivated state. In the mobility by the network control, the PCell may be changed using the RRC connection reconfiguration message including the mobility control information. In the mobility of network control, the RRC connection reconfiguration message including (or not including) the mobility control information may be used to change the SCell (including PSCell).

The secondary cell group may be established, reconfigured, or released using the RRC connection reconfiguration message including (or not including) the mobility control information for the secondary cell group. In a case that the random access to the PSCell is required in the secondary cell group reconfiguration, a secondary cell group changing procedure (i.e., the RRC connection reconfiguration message including mobilityControlInfoSCG) may be used.

Figure 13:
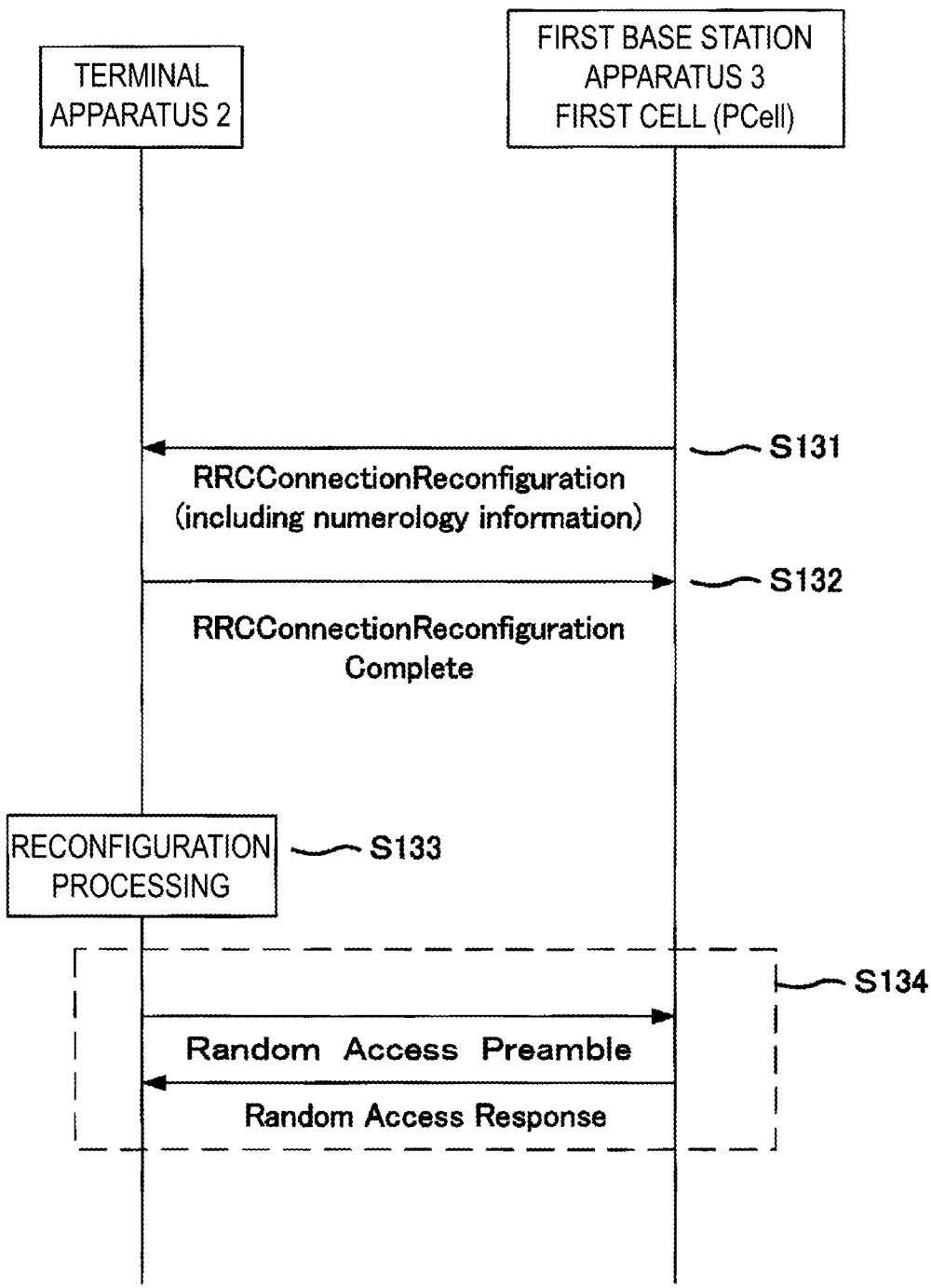
FIG. 13 is a diagram illustrating an example of the SCG configuration procedure according to an embodiment of the present invention.

In FIG. 13, first, the first base station apparatus 3 generates an RRC connection reconfiguration message configured for the terminal apparatus 2. The generated RRC connection reconfiguration message may have the same configuration as in the case that the secondary cell group does not include the first cell.

The first base station apparatus 3 notifies the terminal apparatus 2 of the RRC connection reconfiguration message (RRCConnectionReconfiguration) including the configuration for the terminal apparatus 2 to indicate to the terminal apparatus 2 to configure the secondary cell group including the addition of the second cell (step S131).

The terminal apparatus 2 that can receive the RRC connection reconfiguration message and follow the configuration including the RRC connection reconfiguration message transmits an RRC connection reconfiguration complete message (RRCConnectionReconfigurationComplete) to the first base station apparatus 3 (step S132). Furthermore, based on the information on the RRC connection reconfiguration message, the following reconfiguration processing starts (step S133).

In the reconfiguration process at step S133, in a case that the RRC connection reconfiguration message includes mobility control information for the secondary cell group and does not include mobility control information for the master cell group (that is, no handover), or in a case that the secondary cell group configuration included in the RRC connection reconfiguration message is configured to be released, the terminal apparatus 2 may reset the function of the MAC layer for the secondary cell group based on the configuration. Even in the case that the RRC connection reconfiguration message includes the mobility control information for the secondary cell group and does not include the mobility control information for the master cell group (that is, no handover), or in the case that the secondary cell group configuration included in the RRC connection reconfiguration message is configured to be released, in a case that the PCell and the PSCell are the same cell (or in a case that the configuration for the same cell is indicated in the RRC connection reconfiguration message), the terminal apparatus 2 may not perform re-establishment or data recovery on the PDCP layer. However, for example, in such a situation that, in a state where a cell different from the PCell is already configured as the PSCell, the PSCell is changed to the same cell as the PCell, in a case that there are the DRB (Split DRB) Split into both the MCG and the SCG and/or the DRB (SCG DRB) having only the SCG, the terminal apparatus 2 may perform the data recovery on the PDCP layer. For example, in a state where a cell which is different from the PCell is already configured as the PSCell, the PSCell may be changed to a cell identical to the PCell. In such a situation, in a case that there are the DRB divided (split) for both the MCG and the SCG (Split DRB), and/or the DRB for only SCG (SCG DRB) in the RRC connection reconfiguration message, the terminal apparatus 2 may perform the data recovery on the PDCP layer. In the case that the RRC connection reconfiguration message includes the mobility control information for the secondary cell group, or in the case that the secondary cell group configuration included in the RRC connection reconfiguration message is configured to be released, the terminal apparatus 2 may perform re-establishment on the RLC layer for the master cell group and/or the RLC layer for the secondary cell group. In the case that the RRC connection reconfiguration message includes the mobility control information for the secondary cell group and does not include the mobility control information for the master cell group (that is, no handover), or in the case that the secondary cell group configuration included in the RRC connection reconfiguration message is configured to be released, the terminal apparatus 2 may put a cell other than the PSCell among the SCells of the secondary cell group into the deactivated state.

In the reconfiguration process at step S133, in a case that the received secondary cell group configuration is configured to be released, the terminal apparatus 2 may release the secondary cell group configuration other than the DRB configuration to stop the timer for the secondary cell group.

In the reconfiguration process at step S133, in a case that the RRC connection reconfiguration message includes a radio resource configuration specific to the terminal apparatus 2, the terminal apparatus 2 may reconfigure the specific radio resource configuration. In a case that the RRC connection reconfiguration message includes addition/modification information of a cell to be the PSCell, the terminal apparatus 2 performs addition or modification of the PSCell. In a case that the RRC connection reconfiguration message includes addition/modification information of a cell to be the SCell of the secondary cell group, the terminal apparatus 2 may perform addition or modification of the SCell of the secondary cell group. In a case that the RRC connection reconfiguration message includes information for releasing the SCell of the secondary cell group, the terminal apparatus 2 may perform release of the SCell of the secondary cell group.

Even in the case that the RRC connection reconfiguration message includes the mobility control information for the secondary cell group, a new synchronization does not need to be started because the downlink to the target PSCell (first cell) is already synchronized, but the terminal apparatus 2 may start downlink synchronization based on new numerology information.

Here, in a case that numerology information for the synchronization signal is included in the RRC connection reconfiguration message, the terminal apparatus 2 may detect the synchronization signal based on the information. In a case that the numerology information for the synchronization signal is not provided in the RRC connection reconfiguration message, the terminal apparatus 2 may attempt to detect the synchronization signal using a pre-determined numerology. Accordingly, the numerology for the synchronization signal detected in a case that there are multiple numerologies that may be used for the synchronization signal to the target cell can be uniquely specified.

The terminal apparatus 2 may initiate the random access procedure to transmit the uplink data and transmit the random access preamble. A third base station apparatus 3 that has received the random access preamble may detect a deviation in a transmission timing of the terminal apparatus 2, and transmit a random access response including information (timing advance command) for correcting the deviation to the terminal apparatus 2 (step S134). In a case that the numerology information for the random access preamble is included in the RRC connection reconfiguration message, the terminal apparatus 2 may transmit the random access preamble based on the information. In a case that the numerology information for the random access preamble is not provided in the RRC connection reconfiguration message, the terminal apparatus 2 may transmit the random access preamble using the pre-determined numerology.

In this way, the appropriate numerology can be configured for each terminal apparatus 2 in the case that multiple numerologies are supported in the target cell. In a case that the numerology information for receiving the random access response is included in the RRC connection reconfiguration message, the terminal apparatus 2 may receive the random access response based on the information. In a case that the numerology information for receiving the random access response is not provided in the RRC connection reconfiguration message, the terminal apparatus 2 may receive the random access response using a pre-determined numerology or a numerology the same as for the synchronized synchronization signal. In this way, the appropriate numerology can be configured for each terminal apparatus 2 in the case that multiple numerologies are supported in the target cell.

The terminal apparatus 2 may transmit the RRC connection reconfiguration complete message (RRCConnectionReconfigurationComplete) to the first base station apparatus 3 after the downlink and/or uplink synchronization with the PSCell. Note that in this case, the RRC connection reconfiguration complete message may be transmitted at the PCell (allocated with the transmission resource of SRB).

In this way, an MCG configuration and SCG configuration in the RRC connection reconfiguration message (e.g., the MAC layer configuration information for each of (8E) radioResourceConfigDedicated and (12A) radioResourceConfigDedicatedSCG) can include the numerology information so that multiple numerologies used in the first cell can be specified.

In a case that the SCG is released, the DRB (and/or the SRB) assigned to the MAC entity for the SCG may be reassigned to the default (the MAC entity for the MCG). At this time, the MAC layer associated with the MAC entity to which the reassignment is made may be reset. The RLC layer associated with the MAC entity to which the reassignment is made and/or the MAC entity to be released may be re-established.

Other methods of notifying of multiple numerologies used in the first cell are described below.

FIG. 14 is a diagram illustrating an example of the above-described (8E) radioResourceConfigDedicated, including (14A) srb-ToAddModList, (14B) drb-ToAddModList, (14C) drb-ToReleaseList, (14D) mac-MainConfig, and (14E) physicalConfigDedicated. (14A) srb-ToAddModList, (14B) drb-ToAddModList, and (14C) drb-ToReleaseList are information used to configure, modify, and/or release the SRB and the DRB. (14D) mac-MainConfig is information for changing the MAC layer configuration. (14E) physicalConfigDedicated is information about the channel configuration for the physical layer.

By extending (8E) radioResourceConfigDedicated, an example of notifying of multiple numerologies is described with reference to FIG. 15 and FIG. 16.

FIG. 15 is a diagram illustrating an example of notifying of information on each MAC entity in a case that two MAC entities are supported in one cell.

In FIG. 15, each of m-mac-MainConfig and s-mac-MainConfig may include a configuration for a MAC entity and DRB (and/or SRB) information transmitted and/or received using the MAC entity. For example, some or all of identifiers (drbIdentity) for identifying the DRBs included in drb-ToAddModList and identifiers (srbIdentity) for identifying the SRBs included in srb-ToAddModList may be may be included as a list in each of m-mac-MainConfig and s-mac-MainConfig. This makes it possible to specify which of (or both) the MAC entities are used to transmit and/or receive the DRB (and/or the SRB). The DRB (and/or the SRB) that is not included in any of the configurations may be assigned to the default (e.g., MAC entity configured with m-mac-MainConfig). This can reduce signaling.

In a case that s-mac-MainConfig is released, the DRB (and/or the SRB) assigned to the MAC entity specified in s-mac-MainConfig may be reassigned to the default (MAC entity specified in m-mac-MainConfig, for example). At this time, the MAC layer associated with the MAC entity to which the reassignment is made may be reset. The RLC layer associated with the MAC entity to which the reassignment is made and/or the MAC entity to be released may be re-established.

FIG. 16 is a diagram illustrating another example of notifying of information on each MAC entity in the case that two MAC entities are supported in one cell.

In FIG. 16, mac-MainConfig includes configurations for one or more MAC entities, and a configuration for each MAC entity may include an identifier (macConfIdentity) for identifying the configuration. Information associating drbIdentity or srbIdentity with macConfIdentity may be further included as macIdToAddModList. An identifier (macId) for identifying each piece of associated information may be included in macIdToAddModList. A list including one or more macId to be deleted, as information for deleting (releasing) the association, may be included as macIdToRemoveList. This makes it possible to specify which MAC entity(s) are used to transmit and/or receive the DRB (and/or the SRB). The DRB (and/or the SRB) not included in any of the configurations may be assigned to the default (MAC entity specified in predetermined macConfIdentity, for example). This can reduce signaling.

The DRB (and/or the SRB) assigned to the MAC entity specified in macIdToRemoveList may be reassigned to the default (MAC entity specified in macConfIdentity, for example). At this time, the MAC layer associated with the MAC entity to which the reassignment is made may be reset. The RLC layer associated with the MAC entity to which the reassignment is made and/or the MAC entity to be released may be re-established.

In the above embodiment, in the case that the PCell and the PSCell are the same cell, the base station apparatus 3 may not allow the RRC connection reconfiguration message to include the mobility control information (MobilityControlInfoSCG) for the secondary cell group, and in the case that the PCell and the PSCell are different cells (and/or different frequencies), the base station apparatus 3 may allow the RRC connection reconfiguration message to include the mobility control information (MobilityControlInfoSCG) of the secondary cell group. This allows unnecessary signaling to be avoided.

In the above embodiment, the terminal apparatus 2 may include some or all of the following information (A) to (D) in the radio access capability information of the terminal apparatus 2 (UECapabilityInformation) notified to the base station apparatus 3. (A) the maximum number of supported MAC entities, (B) whether or not two MAC entities are supported, (C) whether or not the PSCell in the same frequency band is supported in Dual Connectivity (whether or not Intra-frequency Dual Connectivity is supported), and (D) information indicating the category of the terminal apparatus 2 supporting the above-described (C).

This allows the base station apparatus 3 to configure appropriate radio resources for the terminal apparatus 2.

In a case that a single MAC entity supports multiple numerologies, each DRB configuration in (14B) drb-ToAddModList may include information indicating which (one or more) of the multiple numerologies are used.

Note that the term "numerology" is used in the above description for convenience, where some or all of the following parameters (A) to (G) used in the system are the numerologies. (A) a sampling rate, (B) a subcarrier spacing, (C) a subframe length, (D) a unit of time used for scheduling (Transmission Time Interval (TTI)), (E) an OFDM symbol length, (F) the number of OFDM symbols included in one subframe, and (G) an antenna port through which a signal and/or a channel is transmitted.

In the above embodiment, information on the transmission time interval (TTI) may be included in the MAC layer configuration (for example, mac-MainConfig described above). Information on the subcarrier spacing (for each signal and/or channel) and/or information on the number of OFDM symbols included in one subframe may be included in the channel configuration for the physical layer (e.g., radioResourceConfigDedicated or physicalConfigDedicated). Information on the transmission time interval of received downlink data and/or the transmission time interval of an acquired uplink transmission resource may be notified from the physical layer of the terminal apparatus 2 to the MAC layer of the terminal apparatus 2. This allows appropriate scheduling based on the transmission time interval to be performed in the MAC layer of the terminal apparatus 2.

Configurations of the apparatuses according to the present embodiment will be described below.

FIG. 2 is a schematic block diagram illustrating a configuration of the terminal apparatus 2 according to the present embodiment. As illustrated in the drawing, the terminal apparatus 2 is configured to include a radio transmission and/or reception unit 20 and a higher layer processing unit 24. The radio transmission and/or reception unit 20 is configured to include an antenna unit 21, a Radio Frequency (RF) unit 22, and a baseband unit 23. The higher layer processing unit 24 is configured to include a medium access control layer processing unit 25 and a radio resource control layer processing unit 26. The radio transmission and/or reception unit 20 is also referred to as a transmitter, a receiver or a physical layer processing unit. A controller controlling operations of the units based on various conditions may be separately provided.

The higher layer processing unit 24 outputs uplink data (transport block) generated by a user operation or the like, to the radio transmission and/or reception unit 20. The higher layer processing unit 24 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing for the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing for the Radio Resource Control layer. The radio resource control layer processing unit 26 manages various types of configuration information/parameters of the radio resource control layer processing unit 26. The radio resource control layer processing unit 26 sets various types of configuration information/parameters based on higher layer signaling received from the base station apparatus 3. Namely, the radio resource control layer processing unit 26 sets the various configuration information/parameters in accordance with the information for indicating the various configuration information/parameters received from the base station apparatus 3.

The radio transmission and/or reception unit 20 performs processing for the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data, and transmits the generated signal to the base station apparatus 3.

The RF unit 22 converts (down converts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a CyclicPrefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, attaches the CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up converted signal via the antenna unit 21. The RF unit 22 amplifies power. The RF unit 22 may have a function to control transmit power. The RF unit 22 is also referred to as a transmit power controller.

Note that the terminal apparatus 2 may include pluralities of some units or pluralities of all the units in order to support transmission and/or reception processing in the same subframe of multiple frequencies (frequency bands or frequency band widths) or multiple cells.

Figure 3:
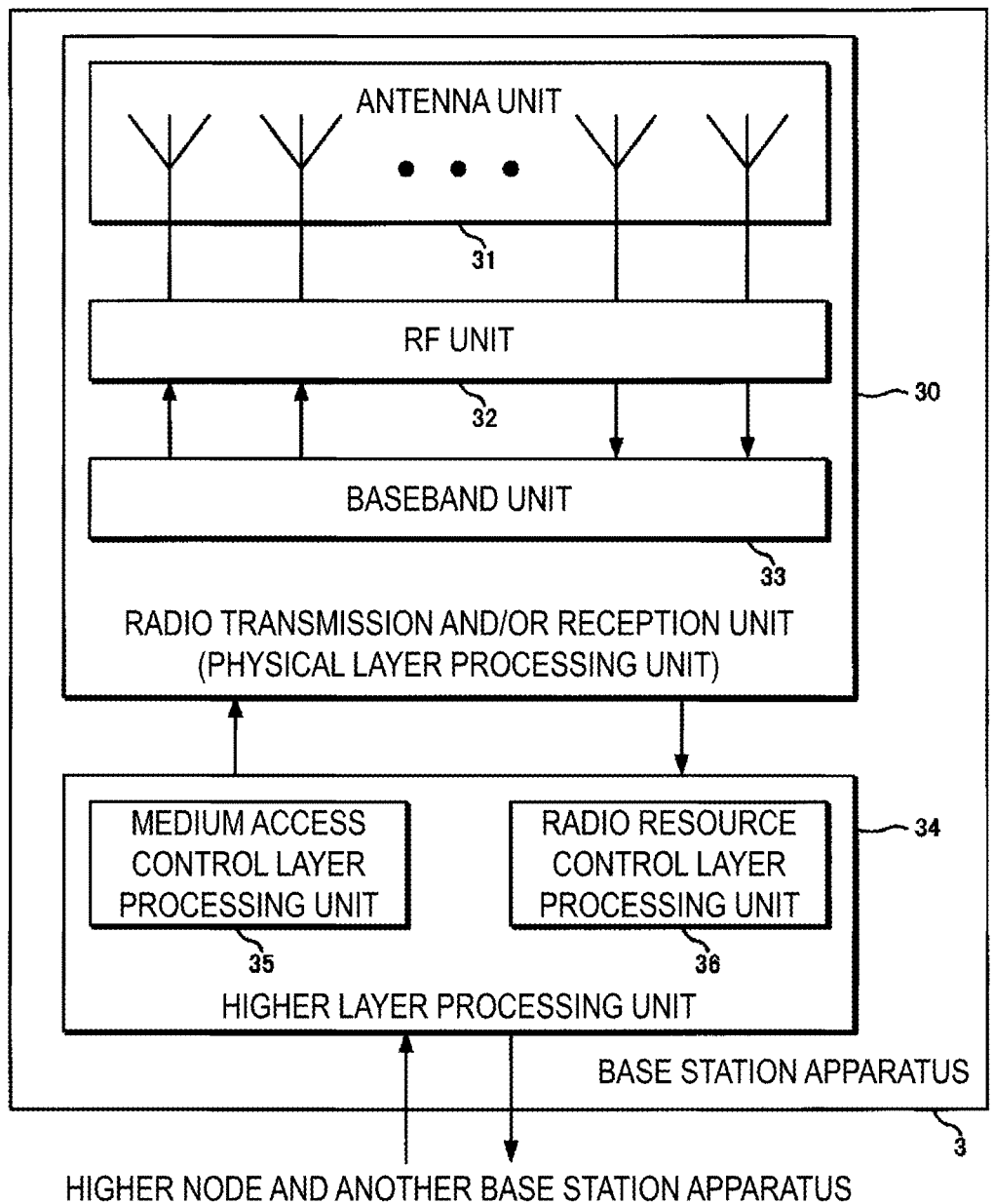
FIG. 3 is a block diagram illustrating an example of a schematic configuration of a base station apparatus according to an embodiment of the present invention.

FIG. 3 is a schematic block diagram illustrating a configuration of the base station apparatus 3 according to the present embodiment. As illustrated in the drawing, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller controlling operations of the units based on various conditions may be separately provided.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing for the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing for the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. The radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 20, and hence a description thereof is omitted. Note that, in a case that the base station apparatus 3 is connected to one or multiple transmission reception points 4, some or all of the functions of the radio transmission and/or reception unit 30 may be included in each of the transmission reception points 4.

The higher layer processing unit 34 transmits (transfers) or receives control messages or user data between the base station apparatuses 3, or between a higher-node network device (MME or Serving-GW (S-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exists in the higher level than the radio resource control layer processing unit 36.

The "units" in the drawing refer to constituent elements to provide the functions and the procedures of the terminal apparatus 2 and the base station apparatus 3. Such a constituent element may be represented by different terms such as a section, a circuit, a constituting device, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Hereinafter, various aspects of the terminal apparatus 2 and the base station apparatus 3 according to the embodiments of the present invention will be described.

(1) A first aspect of the present invention is a terminal apparatus for communicating with a base station apparatus via a cell, the terminal apparatus including a receiver configured to receive a radio resource control (RRC) connection reconfiguration message from the base station apparatus and a controller configured to configure a parameter, based on a parameter configuration included in the radio resource control connection reconfiguration message, wherein the parameter configuration at least includes, for each of multiple cell groups, identifier information on a target cell, a configuration for a subcarrier spacing, information for a time length in a minimum unit of scheduling and/or information indicating a slot length, and re-establishment or data recovery is performed on a PDCP layer in a case that the same cell is not included in the multiple cell groups, and the data recovery is not performed on the PDCP layer in a case that the same cell is included in the multiple cell groups.

(2) A second aspect of the present invention is a base station apparatus for communicating with a terminal apparatus via a cell, the base station apparatus including a receiver configured to receive radio access capability information from the terminal apparatus, a transmitter configured to transmit a radio resource control (RRC) connection reconfiguration message to the terminal apparatus, and a controller configured to generate a parameter configuration to be included in the radio resource control connection reconfiguration message, wherein the parameter configuration includes at least, for each of multiple cell groups, identifier information on a target cell, a configuration for a subcarrier spacing, information for a time length in a minimum unit of scheduling and/or information indicating a slot length, and whether or not the same cell can be included in the multiple cell groups is determined based on the radio access capability information.

(3) A third aspect of the present invention is a communication method applied to a terminal apparatus for communicating with a base station apparatus via a cell, the communication method including at least the steps of receiving a radio resource control (RRC) connection reconfiguration message from the base station apparatus and configuring a parameter, based on a parameter configuration included in the radio resource control connection reconfiguration message, wherein the parameter configuration at least includes, for each of multiple cell groups, identifier information on a target cell, a configuration for a subcarrier spacing, information for a time length in a minimum unit of scheduling and/or information indicating a slot length, and re-establishment or data recovery is performed on a PDCP layer in a case that the same cell is not included in the multiple cell groups, and the data recovery is not performed on the PDCP layer in a case that the same cell is included in the multiple cell groups.

(4) A fourth aspect of the present invention is an integrated circuit to be mounted on a terminal apparatus for communicating with a base station apparatus via a cell, the integrated circuit causing the terminal apparatus to perform receiving a radio resource control (RRC) connection reconfiguration message from the base station apparatus and configure a parameter, based on a parameter configuration included in the radio resource control connection reconfiguration message, wherein the parameter configuration at least includes, for each of multiple cell groups, identifier information on a target cell, a configuration for a subcarrier spacing, information for a time length in a minimum unit of scheduling and/or information indicating a slot length, and re-establishment or data recovery is performed on a PDCP layer in a case that the same cell is not included in the multiple cell groups, and the data recovery is not performed on the PDCP layer in a case that the same cell is included in the multiple cell groups.

(A1) An aspect of the present invention is a terminal apparatus for communicating with a base station apparatus via a cell, the terminal apparatus including: a transmitter configured to transmit capability information to the base station apparatus; a receiver configured to receive a radio resource control (RRC) reconfiguration message from the base station apparatus; and a controller configured to configure a parameter, based on the parameter included in the radio resource control reconfiguration message, wherein the capability information includes information on the maximum number of MAC entities supported by the terminal apparatus.

(A2) An aspect of the present invention is a base station apparatus for communicating with a terminal apparatus via a cell, the base station apparatus including: a receiver configured to receive, from the terminal apparatus, capability information including information on the maximum number of MAC entities supported by the terminal apparatus; a transmitter configured to transmit a radio resource control (RRC) reconfiguration message to the terminal apparatus; and a controller configured to generate a parameter to be included in the radio resource control reconfiguration message, wherein the parameter includes at least configuration information for at least one subcarrier spacing corresponding to a data radio bearer, and the configuration information for the at least one subcarrier spacing is configured based on the capability information.

(A3) An aspect of the present invention is a communication method applied to a terminal apparatus for communicating with a base station apparatus via a cell, the communication method at least including the steps of: transmitting capability information to the base station apparatus; receiving a radio resource control (RRC) reconfiguration message from the base station apparatus; and configuring a parameter based on the parameter included in the radio resource control reconfiguration message, wherein the capability information includes information on the maximum number of MAC entities supported by the terminal apparatus.

(A4) An aspect of the present invention is an integrated circuit to be mounted on a terminal apparatus for communicating with a base station apparatus via a cell, the integrated circuit causing the terminal apparatus to perform: transmitting capability information to the base station apparatus; receiving a radio resource control (RRC) reconfiguration message from the base station apparatus; and configuring a parameter based on the parameter included in the radio resource control reconfiguration message, wherein the capability information includes information on the maximum number of MAC entities supported by the terminal apparatus.

Accordingly, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in each embodiment is not limited to the configuration in which a certain device and another device are directly connected by using a physical line, and includes a configuration in which the devices are logically connected and a configuration in which the devices are wirelessly connected by using a radio technology.

The terminal apparatus 2 is also called a user terminal, a mobile station device, a communication terminal, a mobile device, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or a next generation Node B (gNB).

The base station apparatus 3 according to an aspect of the present invention can also be realized as an aggregation (an apparatus group) including multiple apparatuses. Each of the apparatuses constituting such an apparatus group may include some or all of the functions or the functional blocks of the base station apparatus 3 according to the above-described embodiment. The apparatus group may include a full set of functions or functional blocks of the base station apparatus 3. The terminal apparatus 2 according to the above-described embodiment can also communicate with the base station apparatus 3 as the aggregation.

The base station apparatus 3 according to the above-described embodiment may serve as an Evolved Universal Terrestrial Radio Access Network (EUTRAN) or a NextGen Core network. The base station apparatus 3 according to the above-described embodiment may have some or all of the functions of a node higher than an eNodeB.

A program running on an apparatus according to an aspect of the present invention may serve as a program that controls a Central Processing Unit (CPU) and the like to cause a computer to operate in such a manner as to realize the functions of the embodiment according to an aspect of the present invention. A program or information handled by the program is transitorily stored in a volatile memory such as a Random Access Memory (RAM), a non-volatile memory such as a flash memory, a Hard Disk Drive (HDD), or other storage device systems.

Note that a program for realizing the functions of the embodiment according to an aspect of the present invention may be recorded in a computer-readable recording medium. The functions may be realized by causing a computer system to read the program recorded on this recording medium for execution. It is assumed that the "computer system" herein refers to a computer system built into the apparatus, and the computer system includes an operating system and hardware components such as a peripheral device. The "computer-readable recording medium" may include a semiconductor recording medium, an optical recording medium, a magnetic recording medium, a medium dynamically holding a program for a short time, or other computer-readable recording media.

The respective functional blocks or features of the devices used in the above-described embodiment may be implemented or performed by an electrical circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of a known type, a controller, a micro-controller, or a state machine. The electrical circuit described above may be constituted by a digital circuit, or an analog circuit. In a case that with advances in semiconductor technology, a circuit integration technology with which the current integrated circuit is replaced appears, one or more aspects according to the present invention can also use a new integrated circuit based on the relevant technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to an aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission reception point

The invention claimed is:

1. A terminal apparatus for communicating with a base station apparatus, the terminal apparatus comprising:
a receiver configured to receive a radio resource control (RRC) message from the base station apparatus, wherein:
the RRC message comprises configuration information,
the configuration information is associated with a first cell group or a second cell group and comprises a plurality of parameters, and
the parameters comprise one or more data radio bearer (DRB) identities and subcarrier spacing information corresponding to one or more DRBs; and
a processor configured to execute a program to:
configure the terminal apparatus for the first cell group in response to that the configuration information is associated with the first cell group;
configure the terminal apparatus for the second cell group in response to that the configuration information is associated with the second cell group; and
configure a first DRB in the first or second cell group based on a first of the one or more DRB identities and one of the subcarrier spacing information corresponding to the first DRB.

2. The terminal apparatus according to claim 1, wherein the processor is further configured to execute the program to configure a second DRB in the first or second cell group based on a second of the one or more DRB identities and one of the subcarrier spacing information corresponding to the second DRB.

3. The terminal apparatus according to claim 2, wherein:
the one of the subcarrier spacing information corresponding to the first DRB indicates that one or more first subcarrier spacing is allowed; and
the one of the subcarrier spacing information corresponding to the second DRB indicates that one or more second subcarrier spacing is allowed.

4. A base station apparatus for communicating with a terminal apparatus, the base station apparatus comprising:
a transmitter configured to transmit a radio resource control (RRC) message to the terminal apparatus; and
a processor configured to execute a program to generate the RRC message,
wherein:
the RRC message comprises configuration information;
the configuration information is associated with a first cell group or a second cell group and comprises a plurality of parameters;
the parameters comprise one or more data radio bearer (DRB) identities and subcarrier spacing information corresponding to one or more DRBs;

the terminal apparatus is configured for the first cell group in response to that the configuration information is associated with the first cell group;

the terminal apparatus is configured for the second cell group in response to that the configuration information is associated with the second cell group; and a first DRB is configured for the terminal apparatus in the first or second cell group based on a first of the one or more DRB identities and one of the subcarrier spacing information corresponding to the first DRB.

5. The base station apparatus according to claim 4, wherein a second DRB is configured for the terminal apparatus in the first or second cell group based on a second of the one or more DRB identities and one of the subcarrier spacing information corresponding to the second DRB.

6. The base station apparatus according to claim 5, wherein:

the one of the subcarrier spacing information corresponding to the first DRB indicates that one or more first subcarrier spacing is allowed; and the one of the subcarrier spacing information corresponding to the second DRB indicates that one or more second subcarrier spacing is allowed.

7. A communication method applied to a terminal apparatus for communicating with a base station apparatus, the communication method comprising:

receiving a radio resource control (RRC) message from the base station apparatus, wherein:

the RRC message comprises configuration information, the configuration information is associated with a first cell group or a second cell group and comprises a plurality of parameters, and the parameters comprise one or more data radio bearer (DRB) identities and subcarrier spacing information corresponding to one or more DRBs;

configuring the terminal apparatus for the first cell group in response to that the configuration information is associated with the first cell group;

configuring the terminal apparatus for the second cell group in response to that the configuration information is associated with the second cell group; and configuring a first DRB in the first or second cell group based on a first of the one or more DRB identities and one of the subcarrier spacing information corresponding to the first DRB.

8. The communication method according to claim 7, wherein the communication method further comprises configuring a second DRB in the first or second cell group based on a second of the one or more DRB identities and one of the subcarrier spacing information corresponding to the second DRB.

9. The communication method according to claim 8, wherein:

the one of the subcarrier spacing information corresponding to the first DRB indicates that one or more first subcarrier spacing is allowed; and the one of the subcarrier spacing information corresponding to the second DRB indicates that one or more second subcarrier spacing is allowed.

10. An integrated circuit for a terminal apparatus for communicating with a base station apparatus, the integrated circuit causing the terminal apparatus to:

receive a radio resource control (RRC) message from the base station apparatus, wherein:

the RRC message comprises configuration information, the configuration information is associated with a first cell group or a second cell group and comprises a plurality of parameters, and the parameters comprise one or more data radio bearer (DRB) identities and subcarrier spacing information corresponding to one or more DRBs;

configure the terminal apparatus for the first cell group in response to that the configuration information is associated with the first cell group;

configure the terminal apparatus for the second cell group in response to that the configuration information is associated with the second cell group; and configure a first DRB in the first or second cell group based on a first of the one or more DRB identities and one of the subcarrier spacing information corresponding to the first DRB.

11. The integrated circuit according to claim 10, wherein the integrated circuit further causes the terminal apparatus to configure a second DRB in the first or second cell group based on a second of the one or more DRB identities and one of the subcarrier spacing information corresponding to the second DRB.

12. The integrated circuit according to claim 11, wherein:

the one of the subcarrier spacing information corresponding to the first DRB indicates that one or more first subcarrier spacing is allowed; and the one of the subcarrier spacing information corresponding to the second DRB indicates that one or more second subcarrier spacing is allowed.

13. A communication method applied to a base station apparatus for communicating with a terminal apparatus, the communication method comprising:

transmitting a radio resource control (RRC) message to the terminal apparatus; and generating the RRC message, wherein:

the RRC message comprises configuration information;

the configuration information is associated with a first cell group or a second cell group and comprises a plurality of parameters;

the parameters comprise one or more data radio bearer (DRB) identities and subcarrier spacing information corresponding to one or more DRBs;

the terminal apparatus is configured for the first cell group in response to that the configuration information is associated with the first cell group;

the terminal apparatus is configured for the second cell group in response to that the configuration information is associated with the second cell group; and a first DRB is configured for the terminal apparatus in the first or second cell group based on a first of the one or more DRB identities and one of the subcarrier spacing information corresponding to the first DRB.

14. The communication method according to claim 13, wherein the communication method further comprises configuring a second DRB in the first or second cell group based on a second of the one or more DRB identities and one of the subcarrier spacing information corresponding to the second DRB.

15. The communication method according to claim 14, wherein:

the one of the subcarrier spacing information corresponding to the first DRB indicates that one or more first subcarrier spacing is allowed; and the one of the subcarrier spacing information corresponding to the second DRB indicates that one or more second subcarrier spacing is allowed.

16. An integrated circuit for a base station apparatus for communicating with a terminal apparatus, the integrated circuit causing the base station apparatus to:
- transmit a radio resource control (RRC) message to the terminal apparatus; and
- generate the RRC message, wherein:
- the RRC message comprises configuration information;
- the configuration information is associated with a first cell group or a second cell group and comprises a plurality of parameters;
- the parameters comprise one or more data radio bearer (DRB) identities and subcarrier spacing information corresponding to one or more DRBs;
- the terminal apparatus is configured for the first cell group in response to that the configuration information is associated with the first cell group;
- the terminal apparatus is configured for the second cell group in response to that the configuration information is associated with the second cell group; and
- a first DRB is configured for the terminal apparatus in the first or second cell group based on a first of the one or more DRB identities and one of the subcarrier spacing information corresponding to the first DRB.

17. The integrated circuit according to claim 16, wherein a second DRB is configured for the terminal apparatus in the first or second cell group based on a second of the one or more DRB identities and one of the subcarrier spacing information corresponding to the second DRB.

18. The integrated circuit according to claim 17, wherein:
- the one of the subcarrier spacing information corresponding to the first DRB indicates that one or more first subcarrier spacing is allowed; and
- the one of the subcarrier spacing information corresponding to the second DRB indicates that one or more second subcarrier spacing is allowed.

* * * * *